(12) United States Patent
Kanamaru et al.

(10) Patent No.: US 6,574,197 B1
(45) Date of Patent: Jun. 3, 2003

(54) NETWORK MONITORING DEVICE

(75) Inventors: Hiroo Kanamaru, Tokyo (JP); Masato Ushijima, Tokyo (JP); Kenji Ueda, Tokyo (JP); Yukio Yaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,354

(22) Filed: Dec. 21, 1998

(30) Foreign Application Priority Data

Jul. 3, 1998 (JP) .......................................... 10-189463

(51) Int. Cl.$^7$ ............................................... G06F 11/00
(52) U.S. Cl. ..................... 370/252; 370/230; 370/242; 370/235; 709/223
(58) Field of Search ................................ 370/225, 226, 370/227, 228, 252, 253, 248, 249, 216–224, 230, 243, 246, 254, 257, 258, 241.1, 242; 709/223, 224, 251, 252, 253

(56) References Cited

U.S. PATENT DOCUMENTS

| | | | |
|---|---|---|---|
| 4,627,055 A | | 12/1986 | Mori et al. .................... 371/16 |
| 4,637,013 A | * | 1/1987 | Nakamura .................. 370/221 |
| 4,697,268 A | | 9/1987 | Desyllas et al. .............. 371/67 |
| 4,881,074 A | * | 11/1989 | Reichbauer et al. ........ 370/258 |
| 5,018,133 A | * | 5/1991 | Tsukakoshi et al. ......... 370/256 |
| 5,390,326 A | | 2/1995 | Shah ........................... 395/575 |
| 5,463,763 A | * | 10/1995 | Kubo ............................. 714/4 |

FOREIGN PATENT DOCUMENTS

| JP | 6-4354 | 1/1994 |
|---|---|---|
| JP | 8-95931 | 4/1996 |

OTHER PUBLICATIONS

Walter, "A Robust And Efficient Protocol For Checking The Availability Of Remote Sites", Proc. 6th Workshop on Distributed Data Management and Computer Network, 1982, pp. 45–68.

* cited by examiner

*Primary Examiner*—Dang Ton
*Assistant Examiner*—Tri H. Phan
(74) *Attorney, Agent, or Firm*—Leydig, Voit & Mayer, Ltd.

(57) ABSTRACT

A network monitoring device disposed at a node connected to a network includes a determination unit for sending a monitoring packet to a neighboring node upstream or downstream, and for determining that the neighboring node has broken away from the network unless the determination unit does not receive a response packet from the neighbor, and a notification unit for, when the determination unit has determined that the neighboring node upstream or downstream has broken away from the network, broadcasting a notification packet indicating the event to all other nodes connected to the network.

20 Claims, 10 Drawing Sheets

NETWORK MONITORING DEVICE

BACKGROUND OF THE INVENTION

1. Field of the Invention

The present invention relates to a network monitoring device disposed at a node connected to a network, capable of monitoring the status condition of a connection between at least another node and the network.

2. Description of the Prior Art

Referring now to FIG. 12, there is illustrated a block diagram showing the structure of a prior art network monitoring system as disclosed in for, for example, Japanese Patent Application Laying Open (KOKAI) No. 2-125361. In the figure, reference numeral 1 denotes a network, A1 to An denote host computers, each of which will be referred to as a CPU and each of which is connected to the network 1, B1 to Bn denote storage devices connected to the plurality of CPUS A1 to An, respectively, C1 to Cm denote terminal control devices each of which is connected to two or more CPUS, for controlling communications between the CPUs and some terminals, and D1 to Dk, E1 to Ek, and F1 to Fk denote terminals.

Each of the plurality of CPUs A1 to An includes a time measurement unit for measuring the time of arrival of a monitoring message from another CPU, indicating that the other CPU is running, in order to monitor the operating condition of the other CPU and the status of a connection between the other CPU and the network 1, and a determination unit for determining whether the monitoring message has arrived within a predetermined period of time.

To be more specific, instead of making only one CPU perform centralized management of the operating conditions and so on of the other CPUS, each of the plurality of CPUs A1 to An is allowed to broadcast a monitoring message on the network 1 and gather monitoring messages sent by the other CPUs by its own efforts to check their operating conditions. Each of the plurality of CPUs A1 to An can send a monitoring message at predetermined intervals as long as it is running. Each monitoring message is given an identifier indicating the sender.

For example, assume that the CPU An malfunctions as shown in FIG. 13 and therefore cannot send a monitoring message while the other CPUs A1 and A2 can send a monitoring message. Each of those CPUs can measure the time of arrival of a monitoring message (e.g. CCA-A) from the other CPUs and store the measured time in its storage device. Then, each of the CPUs A1 and A2 can determine that the other CPU An malfunctions because it does not receive a monitoring message from the other CPU An for a predetermined period of time or more.

A problem with such a prior art network monitoring device which is so constructed as mentioned above is that while each of the CPUs within the network can recognize the occurrence of a malfunction in another CPU unless it receives a monitoring message from the other CPU within a predetermined period of time, each of the CPUs needs to increase the length of its monitoring intervals at which it monitors the other CPUs with an increase in the number of CPUs connected to the network 1 because this results in increasing the amount of communication processing in each of all the CPUs, thereby interfering with other communication processing. Another problem is that since each of the CPUs has to periodically broadcast a monitoring message to the other CPUS, it is difficult to apply the prior art network monitoring system to a high-speed switching-type network such as an ATM or Ethernet Switch and there is a limit on the physical topology of the network.

To reduce the amount of communication processing in each of the CPUs connected to the network and apply the prior art network monitoring system to a high-speed switching-type network, each of the CPUs can simply perform a unicast mutual monitoring operation by monitoring a specified CPU. However, if there is provided a server or a manager for centralized-monitoring all the CPUs, a malfunction in the server or the like can cause a malfunction in the whole of the network.

SUMMARY OF THE INVENTION

The present invention is made to overcome the above problems. It is therefore an object of the present invention to provide a network monitoring device capable of decreasing the length of its monitoring intervals at which it monitors at least another CPU or node within a network without an increase in the amount of communication processing in each of the CPUs within the network, thereby expanding its applicability to high-speed switching-type networks.

In accordance with one aspect of the present invention, there is provided a network monitoring device disposed at a node connected to a network, comprising: a response unit, responsive to a monitoring packet from a neighboring node downstream, for sending a response packet to the neighboring node downstream; a determination unit for sending a monitoring packet to a neighboring node upstream, and for determining that the neighboring node upstream has broken away from the network unless the determination unit does not receive a response packet responsive to the monitoring packet from the neighboring node upstream; and a notification unit for, when that the determination unit has determined that the neighboring node upstream has broken away from the network, broadcasting a notification packet indicating the event to all other nodes connected to the network.

In accordance with another aspect of the present invention, there is provided a network monitoring device disposed at a node connected to a network, comprising: a response unit, responsive to a monitoring packet from a neighboring node either upstream or downstream, for sending a response packet to the neighboring node either upstream or downstream; a determination unit for sending a monitoring packet to a neighboring node downstream, and for determining that the neighboring node downstream has broken away from the network unless the determination unit does not receive a response packet responsive to the monitoring packet from the neighboring node downstream; and a notification unit for, when that the determination unit has determined that the neighboring node downstream has broken away from the network, broadcasting a notification packet indicating the event to all other nodes connected to the network.

In accordance with a preferred embodiment of the present invention, the network monitoring device further comprises a management table for storing logical addresses identifying the neighboring nodes upstream and downstream, respectively, and a updating unit for updating the management table when the determination unit has determined that the neighboring node either upstream or downstream has broken away from the network or upon receipt of a notification packet indicating that another node has broken away the network.

In accordance with another preferred embodiment of the present invention, when the node to which the network monitoring device belongs newly participates in the network, the updating unit broadcasts a monitoring packet to all other nodes connected to the network and generates the management table based on response packets responsive to the monitoring packet, which can be sent by the all other nodes.

In accordance with another preferred embodiment of the present invention, in response to a monitoring packet from another node that has newly participated in the network, the response unit sends a response packet responsive to the monitoring packet to the other node and the updating unit updates the management table.

In accordance with another preferred embodiment of the present invention, the determination unit sends a monitoring packet to at least another node disposed between the node to which the network monitoring device belongs to and the neighboring node either upstream or downstream, which has not participated in the network yet.

In accordance with another preferred embodiment of the present invention, when there are a predetermined or more number of other nodes that lie between the node to which the network monitoring device belongs to and the neighboring node either upstream or downstream and that have not participated in the network yet, the determination unit broadcasts a monitoring packet to the other nodes that have not participated in the network yet.

In accordance with another preferred embodiment of the present invention, the network monitoring device further comprises a searching unit for, when the determination unit has determined that the neighboring node either upstream or downstream has broken away from the network, sending a monitoring packet to one or more other nodes that belong to a search area either upstream or downstream, and for searching for a new neighboring node either upstream or downstream based on one or more packets responsive to the monitoring packet.

In accordance with another preferred embodiment of the present invention, unless the searching unit is able to find out the new neighboring node either upstream or downstream through the search area, it changes and shifts the search area including one or more other nodes in an either upstream or downstream direction, and then sends a monitoring packet to the search area again.

In accordance with another preferred embodiment of the present invention, the network monitoring further comprises a numbering unit for adding a time-sequence number to any packet to be sent to another node.

In accordance with another preferred embodiment of the present invention, when the updating unit needs to update the management table using a packet applied thereto from another node, it refers to a time-sequence number added to the packet, and then updates the management table only if the received packet is associated with the latest event that occurred in the other node.

In accordance with another preferred embodiment of the present invention, the network monitoring device further comprises an event sending unit for sending a message indicating the occurrence of an event to a corresponding queue already registered when it is determined on the network that another node has participated in the network or broken away from the network.

In accordance with another preferred embodiment of the present invention, the network monitoring device further comprises one or more other determination units whose operating intervals are different from each other and that of the first determination unit, and one or more other notification units whose operating intervals are different from each other and that of the first notification unit.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
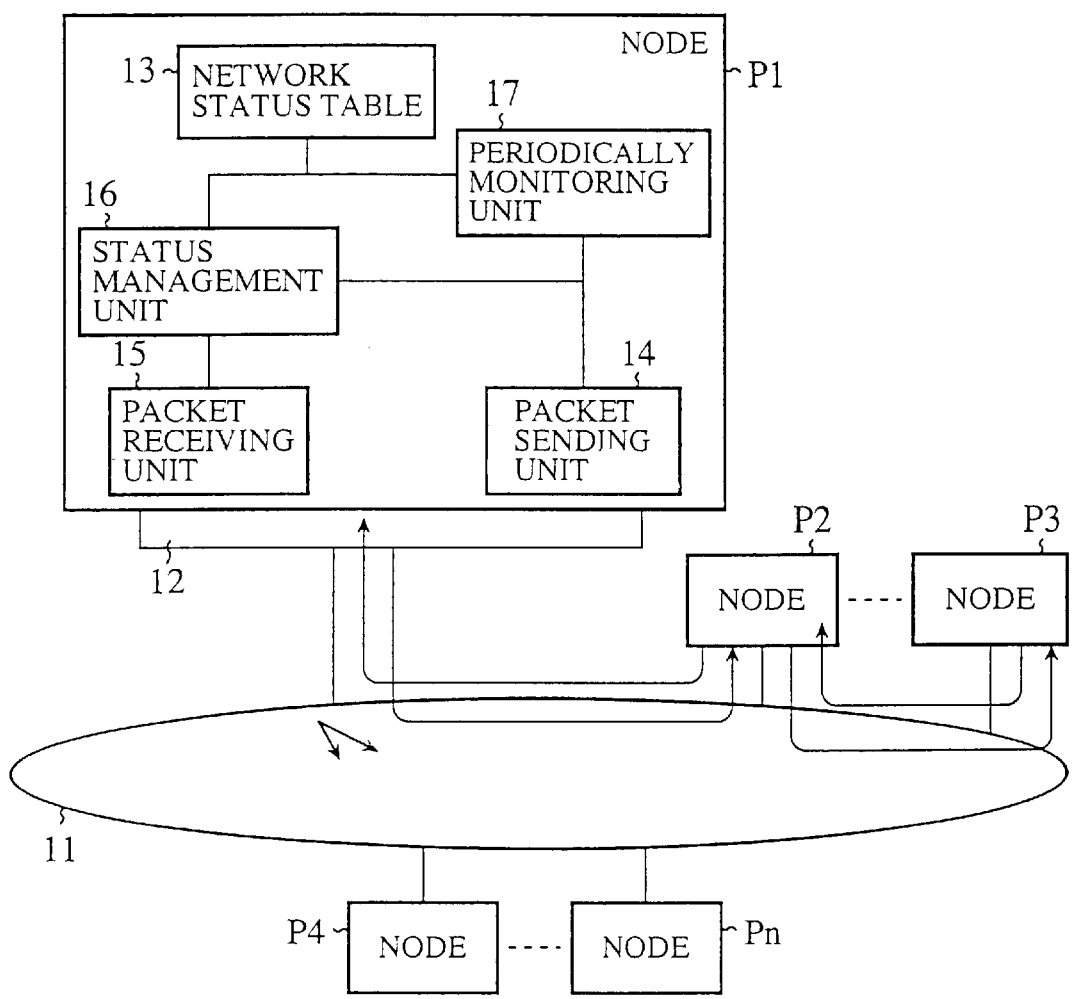
FIG. 1 is a block diagram showing the structure of a network monitoring device according to a first embodiment of the present invention.

Referring next to FIG. 1, there is illustrated a block diagram showing the structure of a network monitoring device according to a first embodiment of the present invention. In the figure, reference numeral 11 denotes a network, 12 denotes an network interface or I/F, P1 to Pn each denotes a node connected to the network 11 by way of the network I/F 12 thereof, 13 denotes a network status table (or network management table) for storing logical addresses to identify its neighboring nodes upstream and downstream, 14 denotes a packet sending unit for sending a response request REQUEST (or monitoring packet) and a response RESPONSE (or response packet) to one or more other nodes, 15 denotes a packet receiving unit for receiving a response request REQUEST, a response RESPONSE, or the like from one or more other nodes, 16 denotes a status management unit, responsive to a response request REQUEST from its neighbor downstream, for sending a response RESPONSE to the request to the neighboring node downstream by way of the packet sending unit 14, and 17 denotes a periodically monitoring unit for sending a response request REQUEST to its neighbor upstream, for determining whether the neighboring node upstream has broken away from the network 11 according to whether the status management unit 16 receives a response RESPONSE to the response request from the status management unit 16 of the neighbor by way of the packet receiving unit 15, and for broadcasting a notify packet indicating that the neighboring node upstream has broken away from the network 11 to all other nodes when it notices the event.

Figure 2:
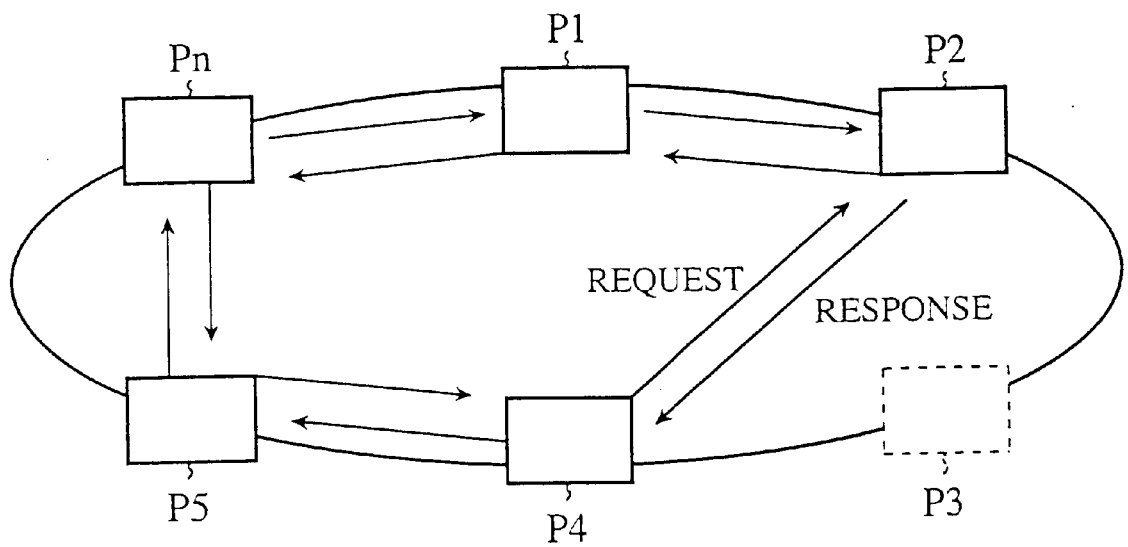
FIG. 2 is a diagram showing the structure of a logical ring including a plurality of connecting nodes for explaining operations of the network monitoring device according to the first embodiment of the present invention.
Figure 3:
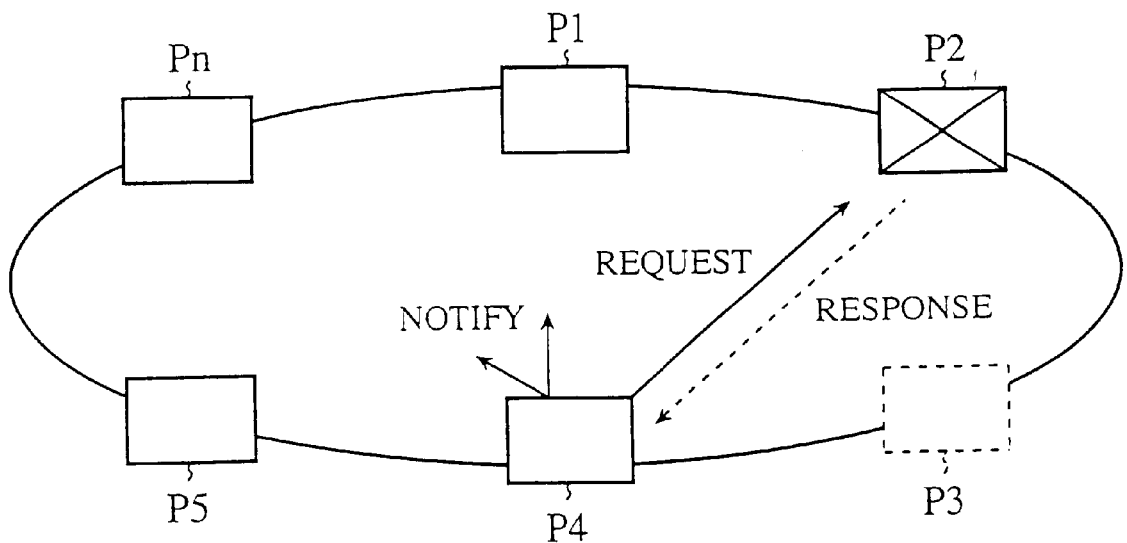
FIG. 3 is a diagram showing the logical ring of FIG. 2 when a node has broken away from the network.

Referring next to FIG. 2, there is illustrated a diagram showing the structure of a logical ring including a plurality of connecting nodes. Each of the plurality of nodes can monitor its neighboring node upstream (i.e. the immediate neighboring node having a higher address) in the logical ring. For example, the node P2 can monitor the node P1, and the node P4 can monitor the node P2 because the node P3 does not participate in the logical ring. Each of the plurality of nodes can periodically send a response request REQUEST to its neighboring node upstream. When the neighboring node upstream receives a response request REQUEST, it furnishes a response RESPONSE to the sender that made the response request. The sender can determine whether or not the neighboring node upstream is alive by monitoring whether a timeout occurs before the arrival of the response RESPONSE from the neighbor. If a timeout occurs, the sender makes a retry. The sender can retry a predetermined number of times before determining that the neighboring node upstream has broken away from the network. In an example as shown in FIG. 3, the node P4 can determine that the node P2 has broken away from the network 11 and then broadcast a NOTIFY packet on the network 11.

Next, a detailed description will be made as to the operations of the network monitoring device with reference to FIG. 1. Information about whether each of the nodes P1 to Pn in the network 11 has participated in or joined the network or has broken away from the network, i.e., whether or not each of the nodes is alive, and information about the operating status of each of the nodes are stored in the network status table 13 of each of the nodes P1 to Pn. The network status table 13 has an array structure with a number of elements the number of which can be determined by the number of the nodes P1 to Pn connected to the network. Locations where pieces of such information about the plurality of nodes are stored in the network status table 13 are determined in the order of the relative addresses of the plurality of nodes in the network.

Once power is turned on in the node PI, information indicating that the node P1 itself is alone on the network, that is, the node P1 is an only member of the network is stored in the network status table 13 of the node P1. The periodically monitoring unit 17 can send a response request REQUEST by way of the packet sending unit 14 at predetermined intervals. Since the network monitoring device at the node P1 determines that it is an only member of the network 11, as mentioned above, the packet sending unit 14 broadcasts the response request REQUEST on the network 11.

Assume now that all the other nodes P2 to Pn have already participated in the network 11 when the node P1 is powered on. When one of the plurality of nodes P2 to Pn, which is the neighboring node upstream from the node P1 (i.e. the immediate neighboring node having a lower logical address), receives the response request REQUEST from the node P1, it refers to its network status table 13 and then sends a response RESPONSE to its neighboring node downstream. In the example as shown in FIG. 2, the node Pn sends a response RESPONSE to the node P1. This is because the node Pn having the smallest logical address can be monitored by its neighboring node P1 that is alive on the network and has the largest logical address.

When the packet receiving unit 15 of the node P1 receives the response RESPONSE from the node Pn, it transfers the response packet to the status management unit 16. Since the response RESPONSE includes information stored in the network status table 13 of the node Pn, the status management unit 16 updates the network status table 13 of the node P1 using the received information.

On the other hand, when each of the plurality of nodes P2 to Pn receives the response request REQUEST from the node P1, it recognizes the participation of the node P1 in the network 11 and then updates its network status table 13. In this manner, each of the plurality of node P2 to Pn can get the network status table 13 updated with the participation of the node P1 in the network 11.

When the node P1 succeeds in participating in the network 11, it starts periodically monitoring its neighboring node upstream Pn while it is monitored by its neighboring node downstream P2. In other words, the periodically monitoring unit 17 sends a response request REQUEST to the node P2, which is the neighboring node upstream, at predetermined intervals. When the packet receiving unit 15 of the node Pn receives the response request REQUEST from the node P1, the status management unit 16 sends a response RESPONSE to the node P1 which is the source of the response request REQUEST by way of the packet sending unit 14 of the node Pn.

The response RESPONSE from the node Pn includes information stored in the network status table 13 of the node Pn. The network status information from the node Pn has been updated with responses from other nodes further upstream, because the network status information stored in one node is passed from the node to its neighbor downstream, like a bucket is passed from one person to another. The status management unit 16 of the node P1, which receives the response from the node Pn, updates the network status table 13 of the node P1 except information about itself using the response.

Unless the response RESPONSE from the node Pn reaches the node P1 within a predetermined period of time after the node P1 has made the response request REQUEST, the periodically monitoring unit 17 of the node P1 sends a response request REQUEST again. Further, unless the node Pn sends back a response even though the node P1 retries a predetermined number of times, the periodically monitoring unit 17 of the node P1 determines that there is something wrong with the communication path between the node P1 and the node Pn or a failure occurs in the node Pn, and therefore assumes that the node Pn has broken away from the network 11. The periodically monitoring unit 17 of the node P1 then writes information indicating the breakaway of the node Pn from the network to the network status table 13. In addition, the periodically monitoring unit 17 of the node P1 broadcasts a NOTIFY packet indicating the breakaway of the node Pn from the network 11 on the network 11. When each node on the network except the node P1 receives the NOTIFY packet from the node P1, it updates its network status table 13.

The node P1, which has detected the breakaway of the node Pn from the network 11, then starts monitoring the node P5 which is the new neighboring node upstream and sending a response request REQUEST at predetermined intervals. If there is no more neighboring node upstream, the node P1 is the only node which is participating in the network 11. In this case, the node P1 broadcasts a response request REQUEST in a way similar to the initial state in which it is powered on. After that, when a node newly participates in the network 11 and then receives the response request REQUEST from the node P1, it can send back a response RESPONSE to the node P1 if it is the neighboring node upstream or downstream from the node P1.

Next, a description will be made as to the operation of the whole of the network. When only the node P1 is participating in the network 11, that is, the node P1 is an only member of the network, it broadcasts a response request REQUEST on the network 11 at predetermined intervals, as previously mentioned. After that, when for instance the node P4 participates in the network, the node P1 can receive a response request REQUEST from the node P4 and then send back a response RESPONSE to the node P4. Alternatively, once the node P4 participates in the network, it can receive a response request REQUEST from the node P1 and then send back a response RESPONSE to the node PI. In either case, the nodes P1 and P4 can recognize the existence of each other. They update their respective network status tables 13 and then start monitoring each other, which is the neighboring node upstream from each other, at predetermined intervals.

Further, when the node P5 participates in the network 11, the nodes P1 and P4, which have already participated in the network 11, can receive a response request REQUEST from the node P5. In this case, they then update their respective network status tables 13. After that, the node P5 receives a response RESPONSE from either the node P4, which is the neighboring node upstream from the node P5, or the node P1, which is the neighboring node downstream from the node P5, and then updates its network status table 13. As a result, the node P1 starts monitoring the newly-participating node P5 at predetermined intervals, and the node P5 starts monitoring the node P4, which has become the neighboring node upstream from the node P5, at predetermined intervals.

If the node P1 breaks away from the network 11 because of power-down or a failure, the node P4, which is the neighboring node downstream for monitoring the P1, can determine that the node P1 has broken away from the network 11 after it periodically retries to send a response request REQUEST a predetermined number of times. The node P4 updates its network status table 13 with the breakaway of the node P1 from the network and then broadcasts a NOTIFY packet indicating the breakaway of the node P1 from the network 11 on the network 11 so as to inform each of all other nodes of the breakaway of the node P1. When each of all other nodes receives the NOTIFY packet, it updates its network status table 13 with the contents of the NOTIFY packet.

The node P4, which has detected the breakaway of the node P1 from the network 11, starts monitoring the node P5, which is the new neighboring node upstream, at predetermined intervals. On the other hand, the node P1, which has broken away from the network 11, temporarily determines that its neighbor P5 upstream from the node P1 has broken away from the network 11 after it retries to periodically send a response request REQUEST to the node P5. However, in the course of retrying, since the node P1 does not receive a response request REQUEST from its neighbor P4 downstream from the node P1 as well, it determines that the node P1 itself rather than the node P5 has broken away from the network 11 in fact. The node P1 is then brought into a state in which it acts as if it is alone on the network so it broadcasts a response request REQUEST without broadcasting a NOTIFY packet indicating that the node P5 has broken away from the network.

In contrast, if the node P1 would determine that only the node p1 itself has not broken away from the network and broadcast a NOTIFY packet indicating the breakaway of the node P5, the NOTIFY packet indicating the breakaway of the node P5 could reach each of all other nodes when for instance a connector which has accidentally become detached from the node P1 is attached again. In this case, the report informing each of all other nodes of the breakaway of the node P5 would turn out to be incorrect.

To prevent each node, which has broken away from the network in fact, from giving a false report indicating the breakaway of its neighbor upstream, each node determines whether the neighboring node upstream has broken away from the network or each node itself has broken away from the network by checking whether a timeout occurs before it receives a response packet or the like from either its neighboring node downstream or another node.

In this manner, there is provided a logical ring including a plurality of nodes arranged in the order of increasing logical addresses and each for monitoring whether its neighbor upstream has participated in or broken away from the network 11, i.e. whether or not its neighbor upstream is alive, each of the plurality of nodes including a network monitoring device according to the first embodiment of the present invention, capable of monitoring the network status condition with reliability by monitoring the status condition of its neighboring node upstream in the logical ring and providing notification of a change in the status condition of the neighboring node upstream to all other nodes.

As can be seen from the above description, according to the first embodiment of the present invention, each of a plurality of nodes on the network can monitor the network status condition according to the same protocol while playing the same role, without having to use a server, a manager, or the like provided in the network for performing a centralized management of the network. As a result, the network system down due to a malfunction in a specific device can be avoided and therefore the fault tolerance of the network system can be improved.

Since the network monitoring device according to the first embodiment of the present invention can form a logical ring based on logical addresses provided for the network 11 in corporation with other network monitoring devices according to the first embodiment of the present invention, and monitor its neighbor upstream in the logical ring, the network monitoring device is independent of the physical structure and medium of the network 11. For example, when IP addresses are used as logical addresses, a network monitoring system designed for a network such as 10BASE-5, 100Base-TX, or ATM can be implemented using a plurality of network monitoring devices according to the first embodiment of the present invention.

Although, in general, network monitoring by broadcasts can increase the number of packets received by each node with an increase in the number of nodes connected to the network, all packets that one network monitoring device according to the first embodiment at each node needs to receive and process under normal conditions are a response request REQUEST from its neighbor downstream and a response RESPONSE to the neighbor because the normal monitoring operation is performed using unicast communications between each node and the neighboring node. In a switching-type network, since a switch makes a number of duplicates of a broadcast packet and then delivers them to all nodes, the utilization factor of available bandwidth is reduced. However, the use of the network monitoring device according to the first embodiment of the present invention at each node makes it possible to offer a high utilization factor of available bandwidth by using parallel communications between nodes through the switch.

In a variant, one network monitoring device at each node can monitor its neighboring node downstream instead of monitoring its neighboring node upstream. For example, the node P2 can monitor the node P3, which is the neighboring node downstream from the P2. The variant can offer the same advantage as provided by the first embodiment mentioned above. Although a description will be made as to an example in which one network monitoring device at each node monitors its neighboring node upstream in either of the following embodiments, as will be mentioned below, it is needless to say that one network monitoring device at each node can be alternatively so constructed as to monitor its neighboring node downstream.

Second Embodiment

Figure 4:
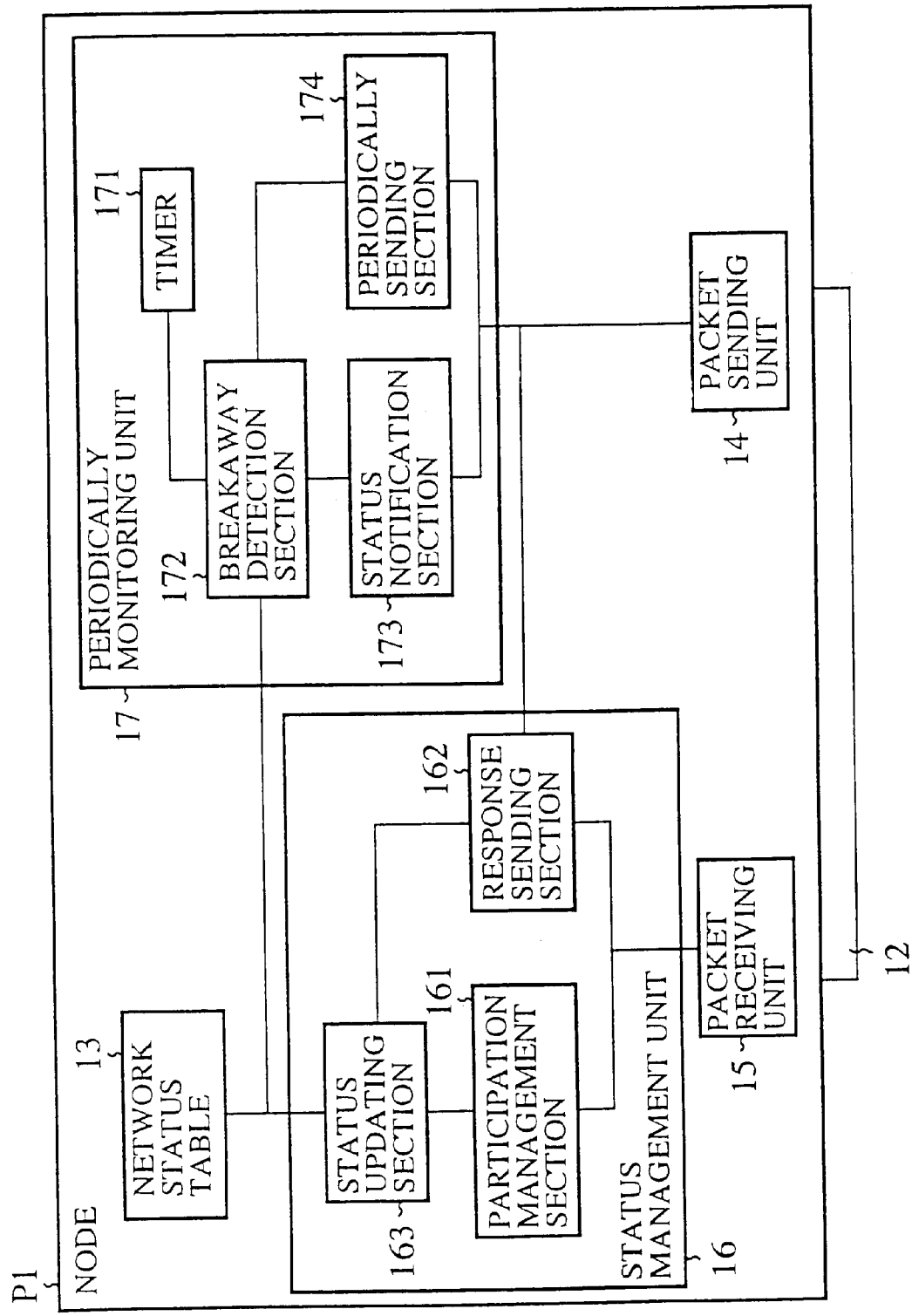
FIG. 4 is a block diagram showing the structure of a network monitoring device according to a second embodiment of the present invention.

Referring next to FIG. 4, there is illustrated a block diagram showing the structure of a network monitoring device according to a second embodiment of the present invention. In the figure, the same reference numerals as in FIG. 1 designate the same components as of the above-mentioned first embodiment or like components.

Reference numeral 161 denotes a participation management section for determining whether or not a response request REQUEST received by a packet receiving unit 15 is a response request REQUEST from another node which has newly participated in the network, 162 denotes a response sending section for sending back a response RESPONSE to the response request REQUEST by way of a packet sending unit 14, 163 denotes a status updating section for updating a network status table 13 with information on the status conditions of other nodes included in the response request REQUEST, 171 denotes a timer for measuring the length of intervals at which the response request REQUEST is made and for furnishing a sending instruction at a time when the response request is to be made, 172 denotes a breakaway detection section for detecting that the neighboring node upstream has broken away from the network, 173 denotes a status notification section for broadcasting a NOTIFY packet on the network 11 when the network monitoring device determines that another node has participated in or broken away from the network or when the network monitoring device determines that its status condition has changed, and 174 denotes a periodically sending section for sending a response request REQUEST to the neighboring node upstream at predetermined intervals.

Every time the periodically sending section 174 receives a sending instruction from the timer 171, it identifies the neighboring node upstream by referring to the network status table 13 and then sends a response request REQUEST to the neighbor upstream. Every time the periodically sending section 174 sends a response request REQUEST, the breakaway detection section 172 checks whether the network monitoring device has received a response RESPONSE to the response request from the neighboring node upstream through the status management unit 16. If the breakaway detection section 172 has not received a response RESPOSE yet, it increments a counter (not shown) thereof and the periodically sending section 174 then sends the response request REQUEST to the neighboring node upstream again. The periodically sending section 174 can repeatedly send the response request REQUEST a predetermined number of times within a predetermined time-out period of time after the receipt of a sending instruction from the timer 171. Unless the breakaway detection section 172 receives a response RESPOSE to the response request from the neighboring node upstream by way of the packet receiving unit 15 and the status management unit 16 within the predetermined time-out period of time, that is, when the counter of the breakaway detection section 172 exceeds a predetermined count value, the breakaway detection section 172 determines that the neighboring node upstream has been brought into a breakaway state in which it cannot communicate with the sender, and then writes information indicating the breakaway of the neighboring node upstream from the network into the network status table 13. The status notification section 173 broadcasts a notify packet to notify all other nodes of the breakaway of the neighbor upstream because they do not know the breakaway of the neighboring node upstream. In contrast, when the network monitoring device can receive a response from the neighboring node upstream within the predetermined time-out period, that is, before the counter of the breakaway detection section 172 exceeds the predetermined count value, the periodically sending section 174 will start sending a response request REQUEST to the neighboring node upstream again in response to the next sending instruction from the timer 171.

When the breakaway detection section 172 detects the breakaway of the current neighboring node upstream while it periodically monitors the neighbor upstream, it refers to the network status table 13 and then sends a SEARCH packet to the next neighboring node upstream by setting the next neighbor upstream to the target to be monitored next. If the next neighboring node upstream has broken away from the network at the same time when the previous neighboring node upstream has broken away from the network, the breakaway detecting unit 172 will detect the breakaway of the next neighboring node upstream after the periodically sending section 174 repeatedly sends the response request REQUEST the predetermined number of times, and then try to monitor the further next neighboring node upstream.

On the other hand, when the packet receiving unit 15 receives a response request REQUEST from another node, the response sending section 162 of the status management unit 16 sends a response RESPONSE to the request source if the source is a target to be monitored on the network 11 and the destinations of the response request include the node to which the packet receiving unit 15 belongs to. The response RESPONSE includes information stored in the network status table 13.

When the network monitoring device receives a response RESPONSE, the participation management section 161 identifies the source or sender. If the source node is the neighboring node upstream, the participation management section 161 resets the counter (not shown) of the breakaway detection section 172 so as to restart measuring the predetermined time-out period. Then the periodically sending section 174 restarts sending a response request REQUEST to the neighboring node upstream repeatedly within the predetermined time-out period. If the source node is closer to the node to which the participation management section 161 belongs as compared with the neighboring node upstream, the participation management section 161 determines that the source node has newly participated in the network. The participation management section 161 then updates the network status table 13 with the participation of the source node in the network, and makes a request of the status notification section 173 to notify all other nodes of the participation of the source node in the network. In contrast, if the source node is more far from the node to which the participation management section 161 belongs than the neighboring node upstream, the participation management section 161 updates the network status table 13 with the contents of the response RESPONSE but does not make a request of the status notification section 173 to notify all other nodes of the participation of the source node in the network.

When the participation management section 161 receives a NOTIFY packet, it updates the network status table 13 with the contents of the NOTIFY packet. A node placed in an initial state is held in a state in which it has not participated in the network yet and operates on a stand-alone basis. Therefore, in the network status table 13 of a node placed in an initial state, there is no other information than that about the node. Thus, since such a node placed in an initial state assumes that its neighboring node upstream is the node itself, the periodically sending section 174 of the node broadcasts a response request REQUEST on the network 11. The periodically sending section 174 repeatedly sends a response request REQUEST until it receives a response RESPONSE from any node connected to the network 11.

Thus, the network monitoring device at each node can manage information on its status condition such as fault conditions or operating conditions and information on other node's status conditions in cooperation with all other nodes by storing the information on its status condition into the network status table 13 thereof. If the status condition of each node changes, the status notification section 173 sends a NOTIFY packet.

As can be seen from the above description, according to the second embodiment of the present invention, there is provided a network monitoring device disposed at each node on a network, which can form a logical ring based on logical addresses provided for the network in cooperation with one or more other network monitoring devices respectively disposed at one or more other nodes, each of the plurality of network monitoring devices disposed at each node in the logical ring being able to monitor whether or not its neighbor upstream is alive at predetermined intervals and update information on the network status condition. Furthermore, each of the plurality of network monitoring devices at each node has a responsibility to notify all other nodes on the network 11 of whether the neighboring node upstream has broken away from the network and whether a new node located between each node and its current neighbor upstream has participated in the network. Therefore, when any one of the nodes on the network provides notification of participation or breakaway of its neighbor in or from the network, it sends a NOTIFY packet only once. The node does not need to send the same NOTIFY packet a plurality of times. Accordingly, the traffic volume can be reduced and wrong information can be prevented from being notified on the network.

Third Embodiment

Figure 5:
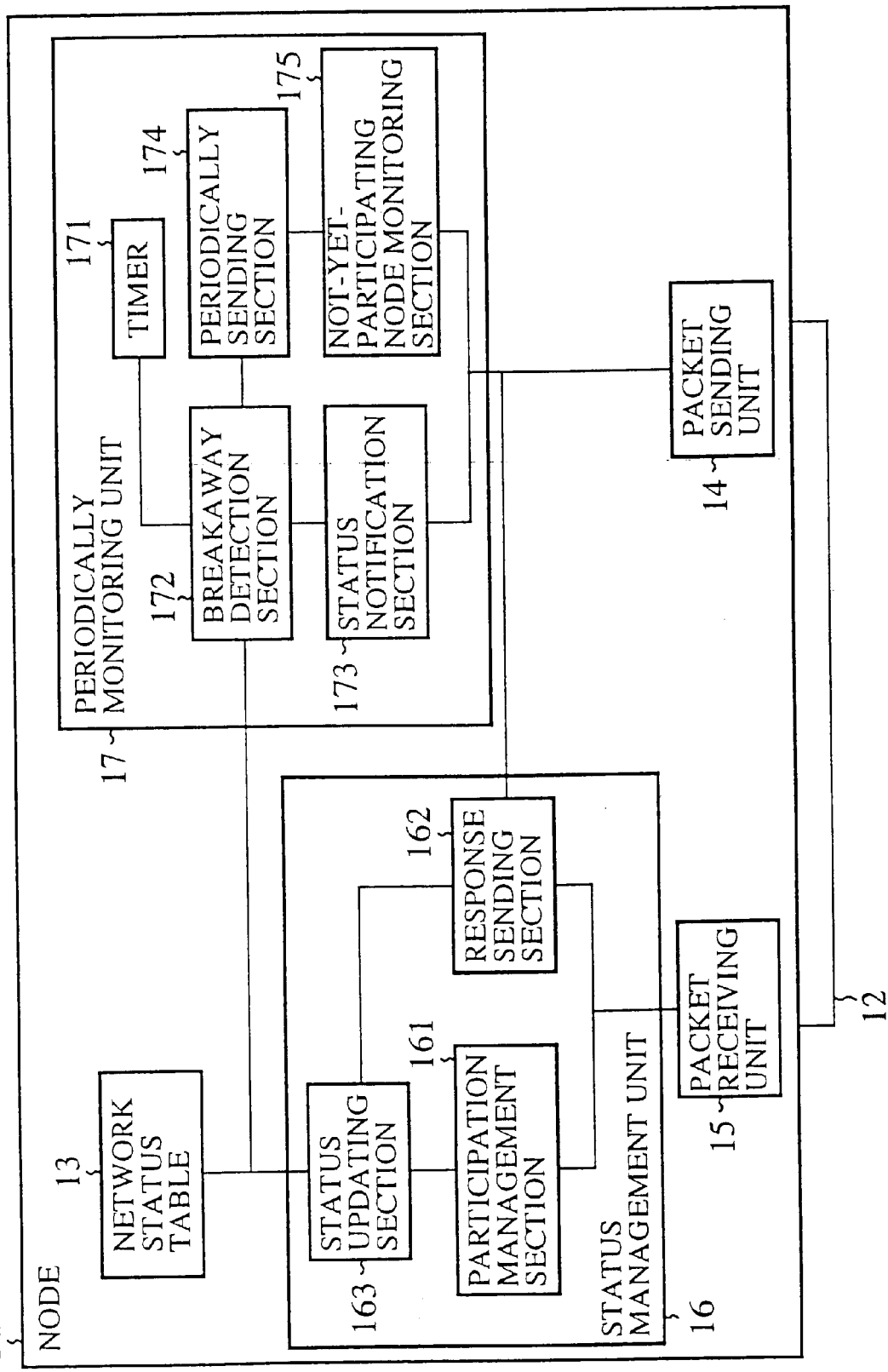
FIG. 5 is a block diagram showing the structure of a network monitoring device according to a third embodiment of the present invention.
Figure 6:
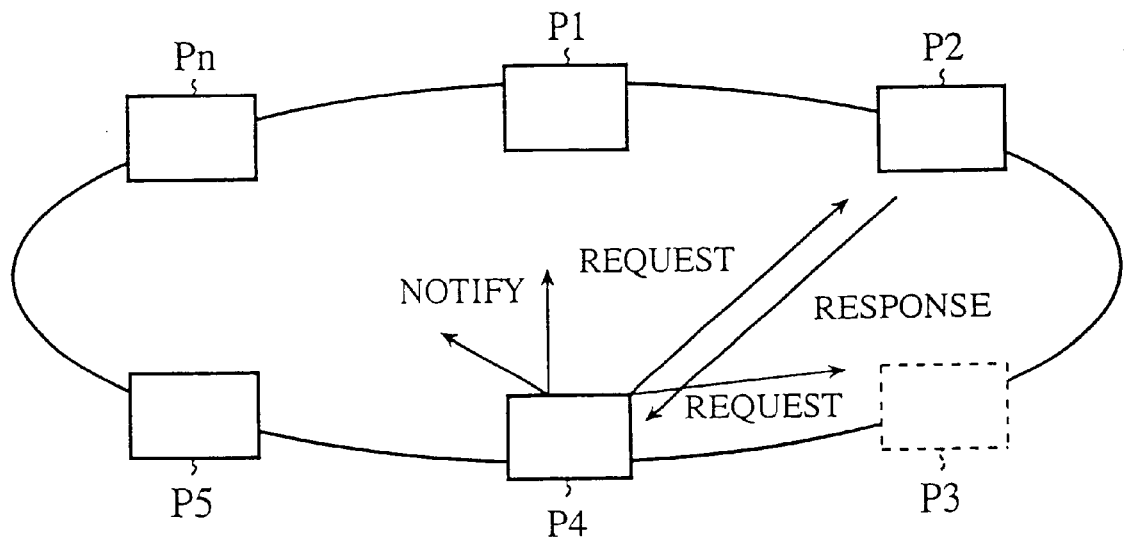
FIG. 6 is a diagram showing the structure of a logical ring including a plurality of connecting nodes for explaining operations of the network monitoring device according to the third embodiment of the present invention.

Referring next to FIG. 5, there is illustrated a block diagram showing the structure of a network monitoring device according to a third embodiment of the present invention. In the figure, the same reference numerals as in FIG. 4 designate the same components as of the above-mentioned second embodiment or like components.

The network monitoring device at each node includes a not-yet-participating node monitoring section 175 for sending a response request REQUEST to one ore more other nodes, which are located between each node and its current neighbor upstream, and which have not participated in the network yet, at predetermined intervals.

When the network to be monitored is constructed hierarchically using network connecting devices such as a repeater and a hub, for example, powering on a connecting device placed at a high level of the hierarchy or the like can connect a plurality of lower networks to a higher network, thereby forming a large network. Although the network monitoring device according to the second embodiment of the present invention can detect the singly participation of a node into the network, it cannot form a larger logical ring even when connecting networks, in each of which mutual monitoring is carried out using a logical ring, with each other.

In contrast, the network monitoring device according to the third embodiment of the present invention can have the capability of forming a large logical ring when connecting networks, by checking whether a node, which is located between each node and its neighbor upstream and which has not participated in the network yet, participates in the network, as well as by broadcasting a response request REQUEST to detect the participation of a node, as mentioned in the first embodiment.

If there are one or more not-yet-participating other nodes, which have not participated in the network yet, between a node and its neighbor upstream in a logical ring, the network monitoring device at the node sends a response request REQUEST to all the not-yet-participating other nodes at predetermined intervals in order to monitor the participation of all the other nodes on the network, in addition to monitoring whether or not the current neighboring node upstream is alive. After the network monitoring device has sent the response request REQUEST, if at least any one of the other nodes participates in the network, it can receive the response request REQUEST and then send back a response RESPONSE to the request source.

For example, the node P4 can send a response request REQUEST to the node P3, which has not participated in the network yet, in addition to monitoring the node P2 that is the neighboring node upstream. After that, when the node P3 participates in the network, it can send back a response RESPONSE to the node P4.

If the source of the response RESPONSE is another node located between the destination, i.e. the node that made the response request REQUEST and its immediate neighboring node upstream, the participation management section 161 of the status management unit 16 updates the network status table 13 because the response to the response request REQUEST sent by the destination node is the one that is sent back by the source node which has newly participated in the network.

In the next monitoring cycle, since the other node, the participation of which in the network was detected in the preceding monitoring cycle, is the newest immediate neighboring node upstream, the network monitoring device at the node in question resets the counter (not shown) of the breakaway detection section 172 so as to restart measuring the predetermined time-out period of time after which the breakaway detection section 172 will determine the breakaway of the newest neighboring node upstream from the network, and then starts monitoring the new neighboring node upstream. If the participation management section 161 determines that a plurality of other nodes have participated in the network 11, it updates the network status table 13 with information about all of the other nodes that have participated in the network. The participation management section 161 then selects the one which is the closest to the node in question including the participation management section 161 from among the plurality of other nodes and sets the selected one to the newest neighboring node upstream to be monitored in the next cycle. The participation management section 161 neglects a response RESPONSE from any node that is farther from the node in question than its current neighbor upstream.

When the participation management section 161 detects the participation of at least another node, it makes a request for network condition notification to the status notification section 173. In the next cycle, the status notification section 173 broadcasts a NOTIFY packet indicating the participation of at least the detected other node on the network 11 so that each of all other existing nodes on the network can recognize the participation of at least the detected other node with the NOTIFY packet.

At a node that has newly participated in the network, the response sending section 162 sends back a response RESPONSE to the response request REQUEST applied thereto. The received response request REQUEST includes information on a specific node domain in which every node within the domain has to send back a response RESPONSE. Therefore, if the node to which the response sending section 162 belongs is located in the specific node domain, i.e. between the source node which has made the response request REQUEST and the immediate neighboring node upstream from the source node, it sends back a response RESPONSE to the source node. In addition, the participation management section 161 monitors at least one or more nodes that have not participated in the network yet. Therefore, when one or more other nodes on another network appear between the node in the current logical ring to which the participation management section 161 belongs and its neighbor upstream, the participation management section 161 can detect the participation of the other nodes in the network. Furthermore, the participation management section 161 can get a NOTIFY packet from any one of the other nodes on the other network and then update the network status table 13, thereby forming a larger logical ring.

The number of not-yet-participating nodes which can participate in an area between a node and its neighbor upstream in a network is (the maximum number of nodes able to be connected to the network—2) if the network includes two existing nodes. Therefore, when the network can include 64 nodes and two existing nodes are alive on the network, for example, each of the two nodes has to monitor 62 nodes that can newly participate in the network. Sending a response request REQUEST to those nodes, which have not participated in the network yet, at predetermined monitoring intervals put an enormous load on the sender. Alternatively broadcasting all response requests REQUEST increases the number of packets to be received and processed by each node, thereby putting an enormous load on the receiver. To solve the problem, the not-yet-participating node monitoring section 175 at each node broadcasts a response request REQUEST if the number of one or more other nodes, which are located between each node and its neighbor upstream and which have not participated in the network yet, is equal to or greater than a predetermined number G, whereas it unicasts (or unidirectionally casts) a response request REQUEST to each of the one or more other nodes if the number of the one or more other nodes is less than the predetermined number G. Thereby, a balance between the amounts of packets received and sent by all nodes on the network can be achieved.

When n nodes are arranged in a logical ring in which connections are possible to a maximum of N nodes, the average of the number of nodes between each of the n nodes and its neighbor upstream to be monitored by each of the n nodes is (N/n). When broadcasting a response request REQUEST at predetermined intervals, the number of packets to be sent by each node is constant regardless of the number n of nodes connected to the logical ring while the number of packets to be received by each node is given by a plot that monotonously increases with an increase in the number n of nodes connected to the logical ring. In contrast, when unicasting a response request REQUEST to each node at predetermined intervals, the average of the number of packets to be sent by each node is given by a plot that monotonously increases with an increase in the average (N/n) of the number of nodes to be monitored by each node while the number of packets to be received by each node is constant regardless of the number n of nodes connected to the logical ring. Accordingly, switching between broadcasting a response request REQUEST and unicasting a response request REQUEST should be carried out at the intersection of those plots. At the intersection of those plots, the number n has a value close to the square root of N. Thus, the predetermined value can be set to a value close to $\sqrt{N}$. As previously explained, the not-yet-participating node monitoring section 175 of the network monitoring device at each node broadcasts a response request REQUEST if the number of one or more other nodes, which are located between each node and its neighbor upstream and which have not participated in the network yet, is equal to or greater than the predetermined number G, whereas it unicasts a response request REQUEST to each of the one or more other nodes if the number of the one or more other nodes is less than the predetermined number G.

As can be seen from the above description, the network monitoring device according to the third embodiment of the present invention can reconstruct a large logical ring to be monitored when connecting separated networks, which can be arranged hierarchically by using network connecting devices such as a repeater and a hub, with each other. Therefore, the third embodiment can be applicable to a variety of network systems regardless of their physical structures.

In addition, since the network monitoring device can dynamically switch between broadcasting and unicasting according to the status condition of the logical ring, it can reduce the volume of network traffic due to response requests passing through the logical ring and the volume of receiving and sending processing in each node. In the case of the use of ATM or Ethernet switch to connect nodes, increasing the number of unicasts by increasing the predetermined value G used for switching between broadcasting and unicasting can improve the switching efficiency.

Fourth Embodiment

Figure 7:
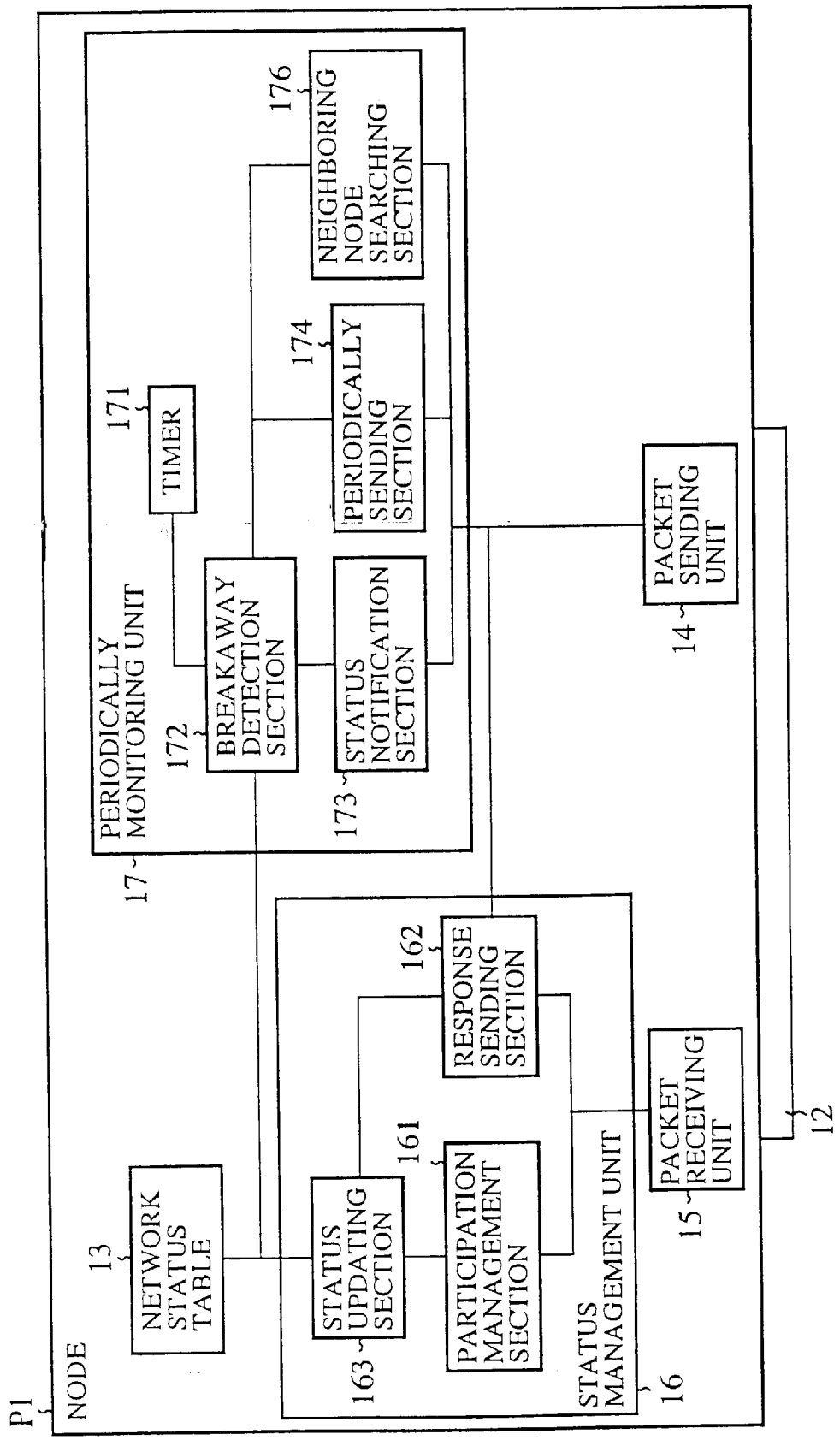
FIG. 7 is a block diagram showing the structure of a network monitoring device according to a fourth embodiment of the present invention.

Referring next to FIG. 7, there is illustrated a block diagram showing the structure of a network monitoring device according to a fourth embodiment of the present invention. In the figure, the same reference numerals as in FIG. 4 designate the same components as of the above-mentioned second embodiment or like components, and therefore the description of the same or like components will be omitted hereinafter.

The network monitoring device at each node includes a neighboring node searching section 176 for, when a breakaway detecting unit 172 detects the breakaway of the current neighboring node upstream, sending a SEARCH packet to all nodes located in a search area, which will be referred to as SEARCH domain, and then searching for the new immediate neighbor upstream according to responses to the SEARCH packet.

In accordance with the above-mentioned second embodiment of the present invention, when the breakaway detecting unit 172 detects the breakaway of the current neighboring node upstream while it periodically monitors the neighbor upstream, it refers to the network status table 13 and then sends a SEARCH packet to the next neighboring node upstream by setting the next neighbor to the target to be monitored next. If the next neighboring node upstream has broken away from the network at the same time when the previous neighboring node upstream has broken away from the network, the breakaway detecting unit 172 will detect the breakaway of the next neighboring node upstream after the periodically sending section 174 repeatedly sends the response request the predetermined number of times and then try to monitor the further next neighboring node upstream. Therefore, when a plurality of neighboring nodes break away from the network simultaneously, it takes much time corresponding to (the time required to determine that a node has broken away from the network, that is, the predetermined time-out period of time during which the periodically sending section 174 repeatedly sends the response request the predetermined number of times) multiplied by (the number of nodes which have broken away from the network simultaneously), for the breakaway detection section 172 to search for the alive, immediate neighboring node upstream to be monitored next.

Figure 8:
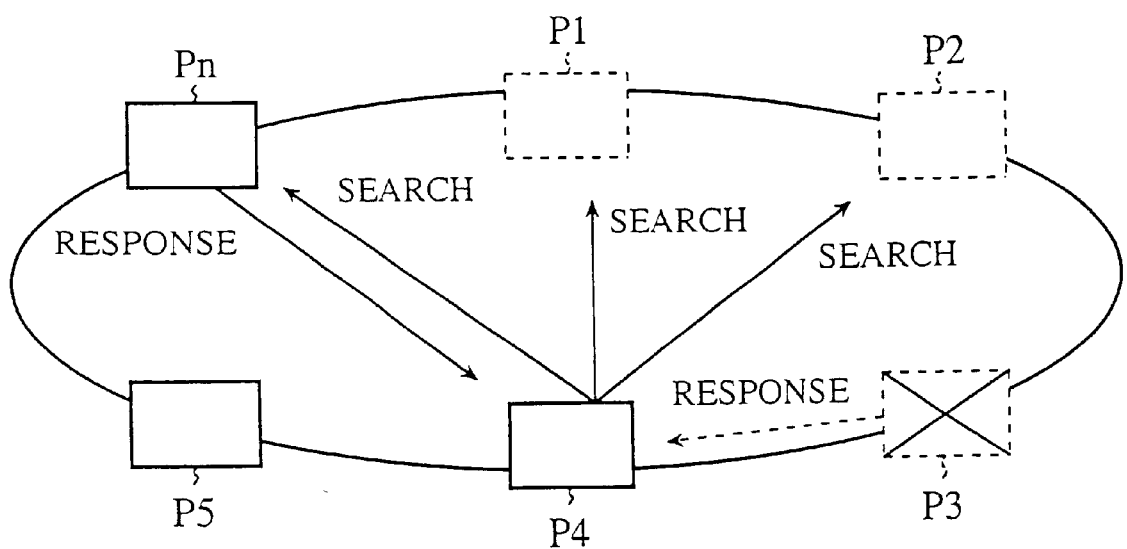
FIG. 8 is a diagram showing the structure of a logical ring including a plurality of connecting nodes for explaining operations of the network monitoring device according to the fourth embodiment of the present invention.

In contrast, when the breakaway detecting section 172 detects or determines that the current neighboring node upstream has broken away from the network 11, the neighboring node searching section 176 according to the fourth embodiment refers to the network status table 13, and then sends a SEARCH packet to the SEARCH domain including a plurality of nodes upstream starting from the next neighboring node upstream, as shown in FIG. 8. The neighboring node searching section 176 sets a node which is the closest one among some of them which have sent back a response to the new neighboring node upstream to be monitored next. The neighboring node searching section 176 divides all other nodes into a plurality of groups each including some neighboring nodes. The neighboring node searching section 176 then selects the one of the plurality of groups that is located upstream and is closest as the SEARCH domain first. As will be described below, if the neighboring node searching section 176 cannot find out the new neighboring node upstream through the SEARCH domain, it sets the next, upstream group to the next SEARCH domain and searches for the new neighboring node upstream through the next SEARCH domain. In other words, if the neighboring node searching section 176 cannot find out the new neighboring node upstream through the SEARCH domain, it shifts the SEARCH domain in an upstream direction so that the shifted SEARCH domain does not overlap the previous SEARCH domain.

The SEARCH packet includes information on the SEARCH domain specifying a plurality of neighboring nodes which have to send a response RESPONSE to the search packet, like the response request REQUEST. The periodically sending section 174 selects the closest, upstream group of neighboring nodes to be searched as the SEARCH domain first, and repeatedly sends the SEARCH packet to the SEARCH domain including a plurality of neighboring nodes a predetermined number of times. The smaller the SEARCH domain, the greater the total number of times that the periodically sending section 174 searches for the new immediate neighboring node upstream. In contrast, the larger the SEARCH domain, the greater the number of responses which the periodically monitoring unit 17 receives. Therefore, in either case, the load of either searching or processing responses can be increased. To reduce to minimums both the load of searching and the load of processing responses, the number of nodes to be included in the SEARCH domain should be appropriately set to about the predetermined value G, at which the not-yet-participating node monitoring section 175 of the above-mentioned third embodiment switches between unicasting a response request REQUEST and broadcasting a response request REQUEST. The periodically sending section 174 can either broadcast or unicast a SEARCH packet to all nodes within the SEARCH domain.

When the neighboring node searching section 176 detects the new immediate neighboring node upstream using the SEARCH packet, it assumes that other nodes located between the node to which the neighboring node searching section 176 belongs to and the new immediate neighboring node upstream have broken away from the network 11, and then repeatedly sends the SEARCH packet to the same SEARCH domain only a remaining number of times. When the status management unit 16 receives a response RESPONSE to the SEARCH packet from a node being searched within the SEARCH domain, the participation management section 161 compares the source of the response RESPONSE with a candidate for the new neighboring node upstream if the source of the response RESPONSE is within the SEARCH domain. If the source is closer to the destination node including the participation management section 161 than the candidate, the participation management section 161 replaces the candidate with the source. In contrast, there is no candidate for the new neighboring node upstream, the participation management section 161 adopts the source as a candidate for the new neighboring node upstream.

If the source of the response RESPONSE is closer to the destination node than all nodes within the SEARCH domain, the status management unit 16 updates the network status table 13 with the contents of the response RESPONSE. The periodically monitoring unit 17 then starts monitoring the source node by assuming that the source node is the new immediate neighboring node upstream. If the source of the response RESPONSE is alternatively outside the SEARCH domain, the status management unit 16 neglects the response.

After the neighboring node searching section 176 finishes sending the SEARCH packet to the same SEARCH domain only the predetermined number of times, the participation management section 161 adopts the final candidate as the new immediate neighboring node upstream and then writes it into the network status table 13. The participation management section 161 also updates the network status table 13 so that it indicates that all nodes located between the node to which the neighboring node searching section 176 belongs and the new immediate neighboring node upstream have broken away from the network. The status notification section 173 then broadcasts a NOTIFY packet indicating the event on the network 11. The periodically monitoring unit 17 then starts monitoring the new immediate neighboring node upstream. If the status management unit 16 receives no response even though the neighboring node searching section 176 repeatedly sends the SEARCH packet to the SEARCH domain the predetermined number of times, the neighboring node searching section 176 shifts the SEARCH domain in an upstream direction and starts sending the SEARCH packet to the next SEARCH domain.

If the status management unit 16 receives no response to the SEARCH packet from the next SEARCH domain, the neighboring node searching section 176 further shifts the SEARCH domain in an upstream direction along the logical ring. Further, if the status management unit 16 receives no response to the SEARCH packet from the SEARCH domain that has made a round along the logical ring and finally reached the source of the SEARCH packet, the status management unit 16 can determine that the node itself to which the status management unit 16 belongs is the only node that is participating in the network 11, that is, the node is alone on the network. In this case, the status management unit 16 updates the network status table 13 so that it indicates that the node in question is alone on the network 11. The periodically monitoring unit 17 then broadcasts a response request REQUEST at predetermined intervals.

As can be seen from the above description, when a plurality of neighboring nodes breaks away from the network simultaneously because of a malfunction in a hub or the like placed in the network, the network monitoring device according to the fourth embodiment of the present invention can speedily search for the new immediate neighboring upstream so as to reconstruct a logical ring to be monitored, and start monitoring the neighbor upstream under normal conditions. In addition, since the SEARCH packet is sent to a limited part of the network, unnecessary response packets are not generated and therefore the efficiency of communication processing can be improved.

In a variant of the exemplary embodiment shown, instead of, if the neighboring node searching section 176 can not find out the new neighboring node upstream through the SEARCH domain after the periodically sending section 174 has sent the SEARCH packet to the SEARCH domain the predetermined number of times, shifting the SEARCH domain in an upstream direction so that the shifted SEARCH domain does not overlap the previous SEARCH domain, the periodically sending section 174 sends the SEARCH packet to the SEARCH domain only once to make a search for the new neighboring node upstream, and the neighboring node searching section 176 shifts the SEARCH domain in an upward direction when no neighbor upstream can be searched for within the current SEARCH domain so that the shifted SEARCH domain overlaps the previous SEARCH domain. The neighboring node searching section 176 of the variant divides the whole of the logical ring to be searched into a plurality of groups each including some nodes, like the above-mentioned fourth embodiment. For example, the neighboring node searching section 176 selects the two of the plurality of groups that are located upstream from and are closest to the node to which the neighboring node searching section 176 belongs as the SEARCH domain first, and the periodically sending section 174 sends the SEARCH packet to the SEARCH domain only once to make a search for the new neighboring node upstream. If the neighboring node searching section 176 cannot find out the new neighboring node upstream through the SEARCH domain, it selects a farther one of the two groups selected in the previous step and the next upstream group as the next SEARCH domain to be searched next. The network monitoring device of this variant thus can detect the new immediate neighboring node upstream in a few cycles ahead of time compared with the method of searching the same SEARCH domain repeatedly according to the aforementioned fourth embodiment, because it can shift the SEARCH domain in an upward direction by a set number of nodes so that the shifted SEARCH domain overlaps the previous SEARCH domain unless it receives any response from the current SEARCH domain every time it sends the SEARCH packet to the SEARCH domain. In addition, since only nodes within the current SEARCH domain can make a response to the SEARCH packet, a concentration of responses the number of which approximately corresponds to the number of nodes included in the SEARCH domain can be generated at the maximum. Therefore, it is effective to increase the number of nodes included in the SEARCH domain up to about the predetermined value G, at which the not-yet-participating node monitoring section 175 of the above-mentioned third embodiment switches between unicasting a response request REQUEST and broadcasting a response request REQUEST.

In another variant of the fourth embodiment, when the neighboring node searching section 176 finds out a candidate for the new immediate neighboring upstream, it sets an upper limit to the SEARCH domain to be the candidate. On the other hand, a lower limit to the SEARCH domain is not varied. Only nodes within the narrowed SEARCH domain downstream from the upper limit belong to the target area to which the neighboring node searching section 176 sends the SEARCH packet from then on in order for the periodically monitoring unit 17 to determine whether or not each of the remaining nodes within the narrowed SEARCH domain has broken away from the network. The other variant thus offers an advantage of being able to prevent the status management unit 16 from receiving redundant responses RESPONSE by narrowing the SEARCH domain as mentioned above.

Fifth Embodiment

Figure 9:
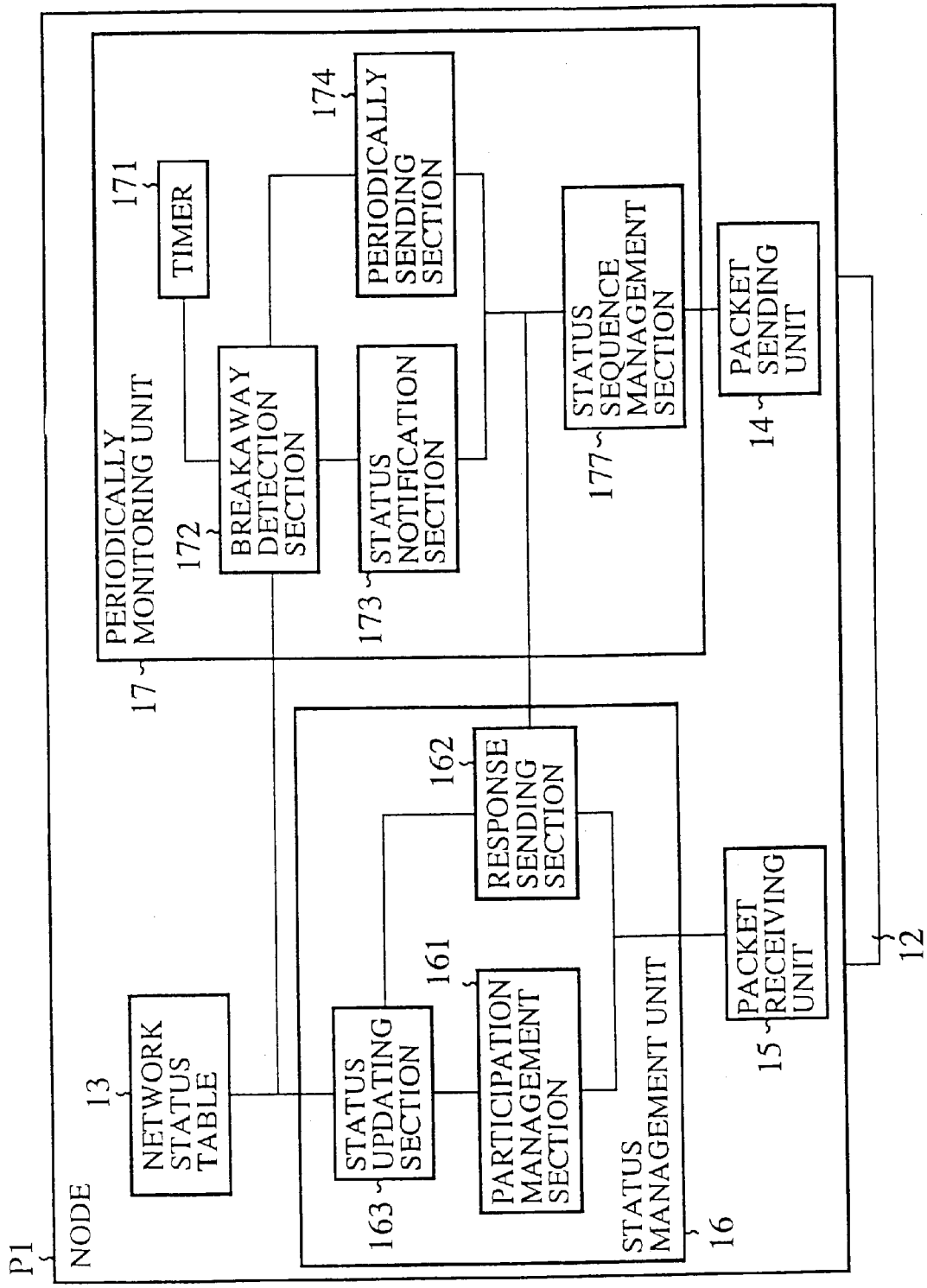
FIG. 9 is a block diagram showing the structure of a network monitoring device according to a sixth embodiment of the present invention.

Referring next to FIG. 9, there is illustrated a block diagram showing the structure of a network monitoring device according to a fifth embodiment of the present invention. In the figure, the same reference numerals as in FIG. 4 designate the same components as of the above-mentioned second embodiment or like components, and therefore the description of the same or like components will be omitted hereinafter.

In FIG. 9, reference numeral 177 denotes a status sequence management section for adding a time-series (or time-sequence) number, which will be hereinafter referred to as request sequence number RSq, to a packet to be sent to another node. When the network monitoring device disposed at a node sends a packet to another node, the status sequence management section 177 adds a request sequence number RSq having a value greater than that of any preceding request sequence number to a packet to be sent to the other node.

In network communications, it cannot be ensured that all packets arrive at their respective destinations because the retransmission of a packet may fail due to the occurrence of a collision and an overflow in a receiving buffer can cause the buffer to discard some packets. In addition, when a node that has not been able to get a NOTIFY packet on the network sends a response RESPONSE including information stored in the network status table 13 thereof to its neighboring node downstream that has been able to get the same NOTIFY packet, the neighbor may update its network status table 13 with the response including the old information rather than the NOTIFY packet. The neighboring node downstream can get wrong information. For example, even though a node receives the NOTIFY packet indicating the breakaway of another node, it may update its network status table 13 with a response including old information indicating that the other node is participating in the network from the neighboring node upstream and then determine by mistake that the other node is still alive.

In order not to invert the time sequence of arrival of NOTIFY packets and responses, the network monitoring device according to the fifth embodiment disposed at each node on the network can have an identical request sequence number RSq and add this number RSq, as a property, to information on its node status condition. When the network monitoring device sends out either a response RESPONSE or a NOTIFY packet, the status sequence management section 177 increments its identical request sequence number RSq and then adds the incremented number to the response packet or the NOTIFY packet to be sent to at least another node. At that time, the status sequence management section 177 also updates the request sequence number stored in the network status table 13.

On the other hand, when the status management unit 16 receives either a response RESPONSE or a NOTYFY packet with a request sequence number RSq, it determines whether or not to update the network status table 13 with the contents of the received packet by comparing the request sequence number RSq added to the received packet with the request sequence number RSq of the source node stored in the network status table 13. The status management unit 16 updates the network status table with the contents of the received packet when the request sequence number RSq added to the received packet is larger or younger than the request sequence number RSq of the source node stored in the network status table 13. Otherwise, the status management unit 16 does not update the network status table. Even though the received packet has a new request sequence number RSq assigned to the node in question to which the status management unit 16 belongs, the status management unit 16 does not update the network status table 13, but replaces the current request sequence number with the new request sequence number RSq added to the received packet. If the new request sequence number RSq added to the received packet is equal to the current request sequence number stored in the network status table 13, the status management unit 16 does not change the current request sequence number.

In principle, each node has and manages its own request sequence number RSq independently. However, there is an exception to the principle. When a node breaks away from the network, the current request sequence number RSq assigned to the node that has broken away from the network is available on the network 11. Therefore, another node that has detected the breakaway of the node has to assign a request sequence number RSq greater than the current request sequence number to the node that has broken away from the network when the other node sends out a NOTIFY packet indicating the event onto the network. To this end, the other node that has detected the breakaway of the former node increments the current request sequence number RSq assigned to the former node by a predetermined value which is equal to or greater than 1 and less than a number of times that the periodically monitoring unit 17 thereof retries until it determines that the former node has broken away from the network.

The request sequence number RSq assigned to each node can be a time stamp because all each node has to do is to ensure the independence of the request sequence number RSq assigned to each node. The request sequence number RSq assigned to each node has a unit that matches the units of time for the network monitoring in such a manner that RSq is defined in units of second in the case of network monitoring cycles of seconds and RSq is defined in units of millisecond in the case of network monitoring cycles of milliseconds. A binary number comprised of a plurality of bits, representing the request sequence number RSq, is reset to an initial value when it overflows. Therefore, which one is larger or smaller between two different n-bit request sequence numbers RSq can be determined if they have a difference which is less than the value of an (n/2)-bit binary number with all bits set to 1. Taking this restriction into consideration, the request sequence number RSq has to have an adequate number of bits according to a period of time during which the network monitoring device monitors its neighboring node upstream. For example, when the network monitoring device monitors its neighboring node upstream at predetermined intervals of 0.1 seconds and the number of bits of the request sequence number RSq is 16, the request sequence number RSq overflows and returns to its initial value after a lapse of 109 minutes. In this case, the determination of whether or not the request sequence number RSq received is the largest or youngest must be performed within a time period of 54 minutes after the network monitoring is started. There is therefore a possibility that if a node participates in the network after a more that 55-minute shutdown, any other node cannot detect the participation of the node in the network. In the case that the number of bits of the request sequence number RSq is 32, the determination of whether or not the request sequence number RSq received is the largest can be performed within a time period of 6.8 years after the network monitoring is started.

To avoid a malfunction in the network to be caused when the request sequence number RSq assigned to a node overflows while the node temporarily suspends, the request sequence number RSq should be far longer than the number of bits corresponding to a shutdown period that would be expected and the node should reset itself when it participates in the network again.

When a node that has participated in the network again resets itself, the request sequence number RSq assigned to the node is reset. However, all other nodes know the value of the request sequence number RSq which was assigned to the node when the node had broken away from the network. Therefore, in order for any of all other nodes to detect and notify all other nodes of the participation of the node in question, the node sets an initial value of the request sequence number RSq to a special value once it resets itself. When another node receives a response request REQUEST with the request sequence number RSq having the special value from the node, it adds the request sequence number RSq assigned to the source node when the source node had broken away from the network, which is stored in the network status table 13, to a response RESPONSE to be sent back to the sender of the response request.

As a result, the reset source node can get its own request sequence number RSq which was left on the network 11 when it had broken away from the network, and then start periodically monitoring its neighboring node upstream.

As can be seen from the above description, in accordance with the fifth embodiment of the present invention, each node can manage its node status condition in orderly time sequence by independently managing its request sequence number RSq. Therefore, even though there are losses of packets such as responses RESPONSE and NOTIFY packets and each node fails to receive such packets, the order in which pieces of information stored in the network status table were generated with respect to time can be ensured. This results in preventing a disruption of the time sequence of the occurrence of events in the network, which will cause a wrong notification, thereby monitoring the status condition of the network with a high degree of reliability.

In addition, since, when a node participates in the network again and then resets itself after a shutdown, it sets an initial value of its request sequence number RSq to a special value, the network can detect the participation of the node and a change in the status condition of the node in orderly time sequence while preventing itself from malfunctioning.

Sixth Embodiment

Figure 10:
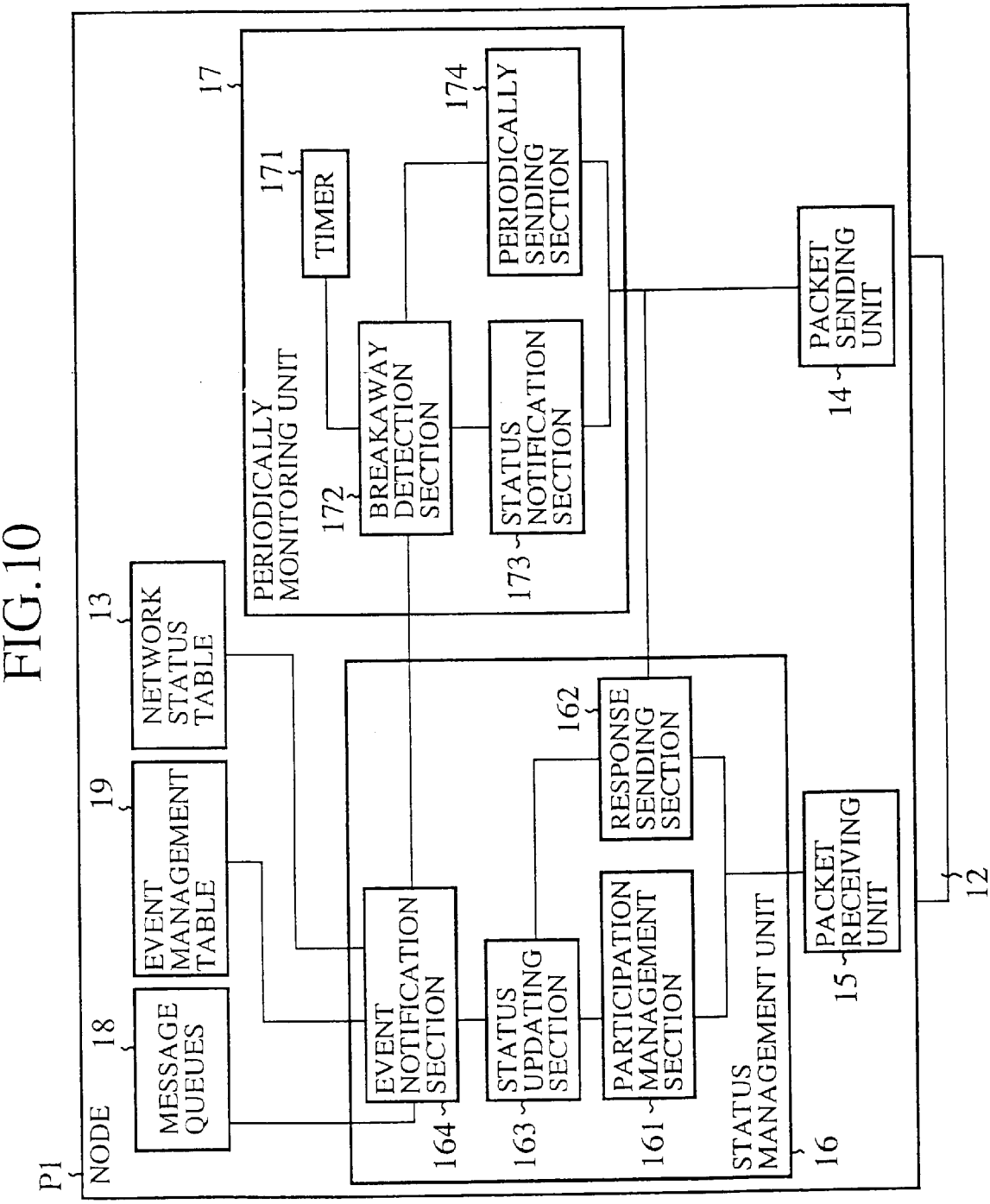
FIG. 10 is a block diagram showing the structure of a network monitoring device according to a seventh embodiment of the present invention.

Referring next to FIG. 10, there is illustrated a block diagram showing the structure of a network monitoring device according to a sixth embodiment of the present invention. In the figure, the same reference numerals as in FIG. 4 designate the same components as of the above-mentioned second embodiment or like components, and therefore the description of the same or like components will be omitted hereinafter.

In FIG. 10, reference numeral 18 denotes a plurality of message queues which can be assigned to a plurality of applications, respectively, and from which the plurality of applications or the like can read information on a change in the status condition of a node, respectively, and 19 denotes an event management table used for informing an event notification section 164 of the types of events to be notified and corresponding ones of the plurality of message queues 18 to which the notification of the occurrence of the events are to be sent, respectively. When the participation or breakaway of another node in or from the network is detected, the event notification section 164 sends the notification of the event to a corresponding message queue 18 registered in the event management table 19.

A communications application or the like can stop or restart communication processing if another node on the other end of the communication suspends or restarts. Then, the communications application or the like can perform switching to another node with which it can communicate, for example. To this end, there is a need to provide means for polling the network status table 13 and for receiving an event notification notifying a change in the status condition of another node from the status management unit 16. When the status updating section 163 updates the network status table 13 with information on the detection of the breakaway of participation of another node, or a response RESPONSE or a NOTIFY packet, the event notification section 164 compares such the information with the current contents of the network status table 13. If either such received information or such a received packet indicates a change in the status condition of another node, the event notification section 164 informs another task waiting to read a corresponding message queue 18 of the change in the status condition of the other node by sending a message to the message queue 18.

In the case where a plurality of tasks wait for notifications of the occurrence of events under different conditions in such a way that task 1 waits for a notification of the occurrence of a malfunction in another node and task 2 waits for a notification of the participation of another node in the network 11, each of the plurality of tasks writes a piece of event notification status information on the type of an event to be notified, a corresponding message queue 18 to which a notification of the occurrence of the event is to be sent, and the source node from which it will receive the notification, into the event management table 19. When the event notification section 164 detects a change in the status condition of another node by comparing received information on the detection of the breakaway of participation of the other node, or a received response RESPONSE or a received NOTIFY packet with the current contents of the network status table 13, it searches for one or more pieces of event notification status information that are associated with the received information or the received packet through the event management table 19. The event notification section 164 then notifies one or more corresponding message queues 18 of the occurrence of the event. Accordingly, when the event management table 19 has more than one piece of event notification status information that are associated with the received information or the received packet, the event notification section 164 can refer to all of them and send the notification of the occurrence of the event to corresponding message queues 18. So the event notification section 164 can notify all tasks waiting for a notification of the occurrence of the event of the occurrence of the event.

As can be seen from the above description, in accordance with the sixth embodiment of the present invention, there is provided a network monitoring device capable of speedily notifying a change in the status condition of another node on the network 11 of all tasks waiting for a notification of the occurrence of the event. Since all tasks to which a notification of the occurrence of an event is to be sent simply wait for such a notification without palling the network status table 13, a waste of the time of the CPU can be reduced.

Seventh Embodiment

Figure 11:
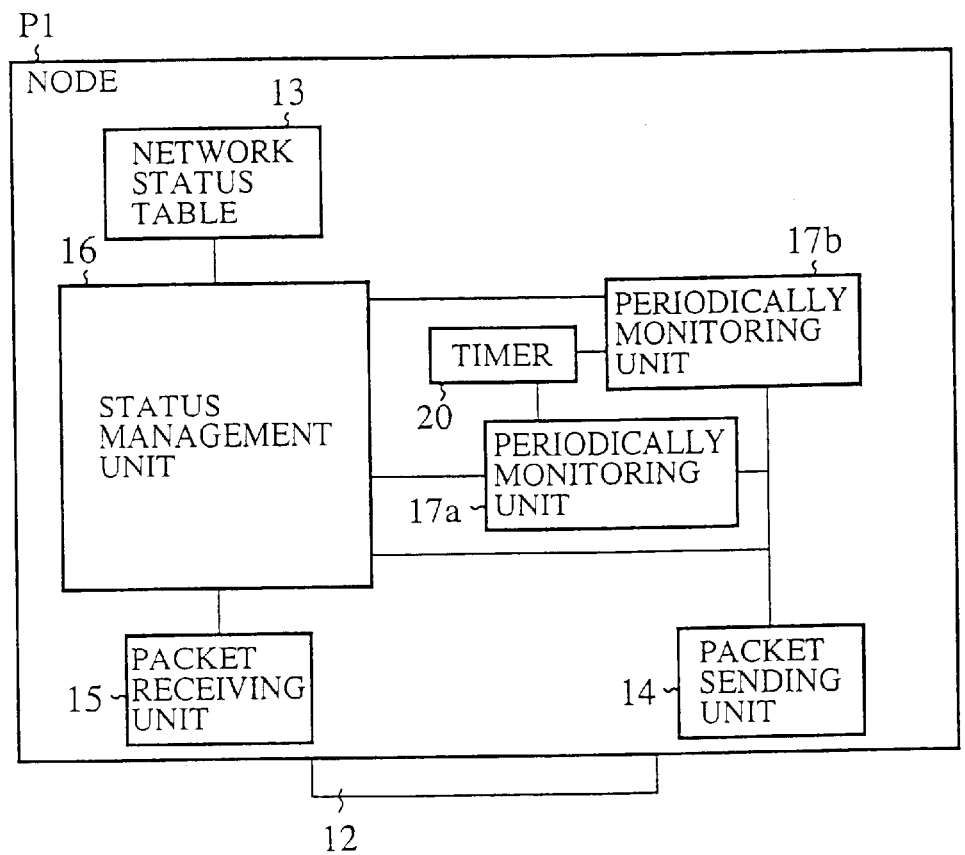
FIG. 11 is a block diagram showing the structure of a network monitoring device according to an eighth embodiment of the present invention.
Figure 13:
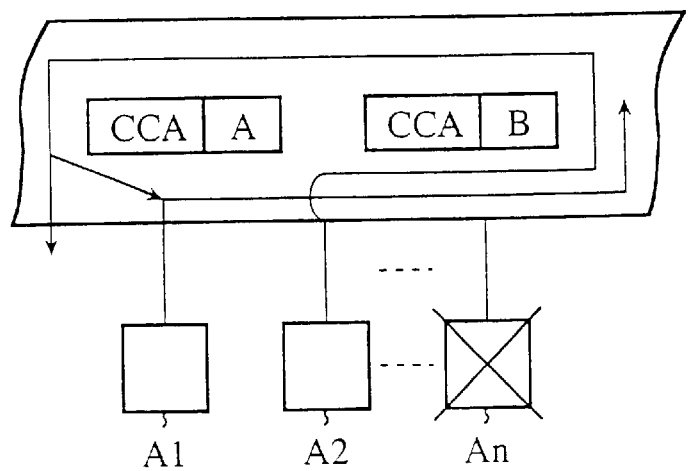
FIG. 13 is a diagram for explaining message transmissions performed in the event of the occurrence of a malfunction in a CPU.
Figure 12:
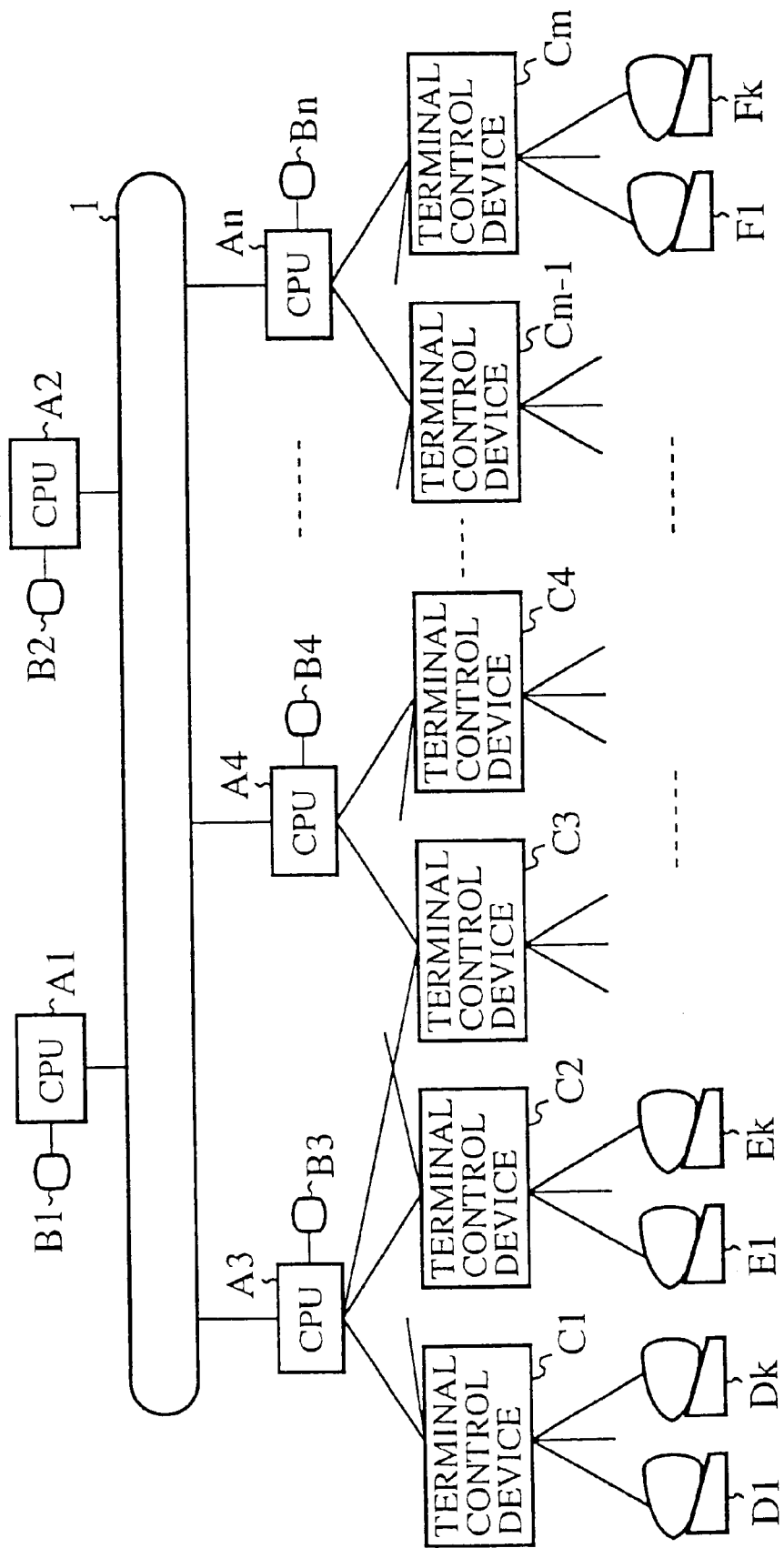
FIG. 12 is a block diagram showing the structure of a prior art network monitoring device.

Referring next to FIG. 11, there is illustrated a block diagram showing the structure of a network monitoring device according to a seventh embodiment of the present invention. In the figure, the same reference numerals as in FIG. 1 designate the same components as of the above-mentioned first embodiment or like components, and therefore the description of the same or like components will be omitted hereinafter.

In FIG. 11, reference numeral 17a denotes a first periodically monitoring unit that is constructed in the same manner as the periodically monitoring unit 17 of FIG. 4, 17b denotes a second periodically monitoring unit that is constructed in the same manner as the periodically monitoring unit 17 of FIG. 7, and 20 denotes a timer that is shared between the first and second periodically monitoring units 17a and 17b.

The network monitoring device according to the above-mentioned second embodiment of the present invention monitors whether or not its neighboring node upstream in a logical ring is alive on the network at predetermined intervals. In this case, the volume of traffic is relatively small and the amount of communication processing is also relatively small, because only a packet to be sent to the destination and a response packet to be sent back to the source are transmitted on the network in each of monitoring cycles. In contrast, when connecting a plurality of networks with each other or when a plurality of neighboring nodes simultaneously break away from the network, it takes much time to reconstruct a logical ring.

On the other hand, the network monitoring device according to the above-mentioned fourth embodiment of the present invention monitors the participation of not-yet-participating nodes placed between the node to which the network monitoring device belongs and its neighboring node upstream at predetermined intervals. In addition, when one or more other neighboring nodes upstream simultaneously break away from the network, the network monitoring device can search for the new immediate neighboring node upstream through an upstream search area including a group of other nodes. In this case, a logical ring can be reconstructed in a short time. However, the volume of traffic on the network is increased to monitor the participation of not-yet-participating nodes and complicated processing for searching an upstream search area is needed.

In communications management of the network 11, a failure of communications has to be detected without delay and needs performing control operations such as saving data and switching to another network while the participation of another node in the network does not need to be speedily detected to such an extent that a failure of communications is detected and does not need performing such control operations. Accordingly, by monitoring whether or not the neighbor upstream is alive at short intervals, and monitoring the participation of one or more other nodes in the network and reconstructing a logical ring if necessary at long intervals, prompt detection of a failure and adequate capability of detecting the participation of one or more other nodes in the network can be implemented and the amount of communication processing for monitoring can be reduced.

The timer 20 that is shared between the first and second periodically monitoring units generates two clocks and triggers the first periodically monitoring unit 17a to start monitoring whether or not the neighboring node upstream is alive at short intervals. The first periodically monitoring 17a sends a response request REQUEST to the immediate neighboring node upstream, like the periodically monitoring unit 17 of FIG. 4. If the node itself to which the first periodically monitoring 17a belongs is alone on the network, the first periodically monitoring 17a broadcasts the response request REQUEST on the network 11. When there is a change in the status condition of the neighboring node upstream, the first periodically monitoring 17a broadcasts a NOTIFY packet indicating the occurrence of the event on the network 11. Such a packet is transmitted onto the network 11 by way of a packet sending unit 14.

The timer 20 also triggers the second periodically monitoring unit 17b at long intervals. The second periodically monitoring unit 17b sends a response request REQUEST to both the neighboring node upstream and one or more not-yet-participating other nodes that have not participated in the network 11 yet, like the periodically monitoring unit 17 of FIG. 7. If there is a change in the status condition of either the neighboring node upstream or one or more not-yet-participating other nodes, the second periodically monitoring unit 17b broadcasts a NOTITY packet indicating the occurrence of the event on the network 11. Such a packet is transmitted onto the network 11 by way of the packet sending unit 14.

The network monitoring device can receive any packet applied thereto, which has been sent at either short or long intervals by another node, by way of a packet receiving unit 15. The packet receiving unit 15 transfers the received packet to a status management unit 16. The status management unit 16 sends a response RESPONSE to the sender of the response request REQUEST if the request is destined for the node itself to which the status management unit 16 belongs, like the status management unit 16 of FIG. 7.

When the network monitoring device receives a response RESPONSE from the neighboring node upstream to be monitored, it resets a timeout flag. When the network monitoring device alternatively receives a response RESPONSE from an upstream search area to be monitored, it either updates the candidate for the new neighboring node upstream or performs a determination process of determining or not whether one or more nodes located between the node to which the network monitoring device and the new neighboring node upstream are alive. In either case, if the received packet is an effective response RESPONSE or NOTIFY packet, the status management unit 16 updates the network status table 13.

If the immediate neighboring node upstream breaks away form the network 11, the first periodically monitoring unit 17a can detect the breakaway of the neighboring node upstream earlier than the second periodically monitoring unit 17b. After that, the first periodically monitoring unit 17a starts periodically monitoring whether or not the next (or new) neighboring node upstream is alive at short intervals. On the other hand, the second periodically monitoring unit 17b searches for the new neighboring node upstream through a search area upstream in response to the detection of the breakaway of the previous neighboring node upstream by the first periodically monitoring unit 17a. When the status management unit 16 receives a response RESONSE to the response request made by either the first or second periodically monitoring unit 17a or 17b for monitoring the new neighboring node upstream or searching through the upstream search area, and then updates the network status table 13, both the first and second periodically monitoring units 17a and 17b start periodically monitoring the new immediate neighboring node upstream. If the status management unit 16 receives a response RESPONSE to the response request made by the first periodically monitoring unit 17a before the second periodically monitoring unit 17b starts searching for the new neighboring node upstream through the search area upstream, the new neighboring node upstream is determined. After that, the second periodically monitoring unit 17b therefore does not search for the new neighboring node upstream through the search area upstream.

There are variations in the responses of all nodes to be monitored on the network 11. In case that there are high-response nodes that can send back a response to a request at a high speed and low-response nodes that cannot send back a response to a request at a high speed, the network monitoring device at each high-response node enable only the second periodically monitoring unit 17b to operate at long intervals and the network monitoring device at each low-response node enable both the first and second periodically monitoring units 17a and 17b to operate at short intervals and operate at long intervals, respectively. Each node has a status flag indicating that each node is either a high-response node or a low-response node, which is stored in the network status table 13 thereof. When participating in the network 11, each node notifies all other nodes of whether it is either a high-response node or a low-response node, i.e. the status flag mentioned above. The first periodically monitoring unit 17a that can operate at short intervals selects the immediate neighboring node upstream from among a plurality of participating high-response nodes and then monitors the neighboring node upstream periodically. The plurality of high-response nodes thus forms another logical ring to be monitored by each other at short intervals. On the other hand, the second periodically monitoring unit 17b that can operate at long intervals periodically monitors the immediate neighboring node upstream that can be either a high-response node or a low-response node and also searches for the new immediate neighboring node upstream through an upstream search area that can include both a high-response node and a low-response node.

The status management unit 16 at a low-response node does not receive a response request from its neighboring high-response node downstream. The first periodically monitoring unit 17a that can operate at short intervals can receive a packet, such as a response request REQUEST made by another node that assumes that it is alone on the network, or a NOTIFY packet sent by another node, which is broadcasted by the other node. The status management unit 16 then updates the network status table 13. In other words, although each low-response node does not make a response request and make a response at short intervals, each low-response node receives and manipulates notification of a change in the status condition of another node from a high-response node so as to get the information on the change.

As can be seen from the above description, in accordance with the seventh embodiment of the present invention, there is provided a network monitoring device capable of monitoring whether or not the neighboring node upstream is alive at short intervals, and monitoring the participation of one or more other nodes in the network and reconstructing a logical ring at long intervals, thereby implementing prompt detection of a failure and adequate capability of detecting the participation of one or more other nodes in the network, and reducing the amount of communication processing for monitoring. Even when there are variations in the responses of all nodes to be monitored on the network 11, each high-response node can perform a monitoring operation at both short and long intervals and each low-response node can perform a monitoring operation at long intervals only, so that all the nodes on the network monitor each other.

Numerous variants may be made in the exemplary embodiment shown. It is apparent that either of the packet receiving unit and the packet sending unit 14 or both can be divided into a first section that can operate at short intervals and a second section that can operate at long intervals. In a variant, the second periodically monitoring unit 17b can have the same structure as that of the periodically monitoring unit 17 of FIG. 5 or FIG. 9. It is also clear that the status management unit 16 can have the functionality of notifying the occurrence of an event provided by the status management unit 16 of FIG. 10.

Many widely different embodiments of the present invention may be constructed without departing from the spirit and scope of the present invention. It should be understood that the present invention is not limited to the specific embodiments described in the specification, except as defined in the appended claims.

What is claimed is:

1. A network monitoring device disposed at a node connected to a network, comprising:
    response means, responsive to a monitoring packet from a neighboring node downstream, for sending a response packet to the neighboring node downstream;
    determination means for sending the monitoring packet to a neighboring node upstream, and for determining that the neighboring node upstream has broken away from said network if said determination means does not receive the response packet responsive to the monitoring packet from the neighboring node upstream; and
    notification means for, when said determination means has determined that the neighboring node upstream has broken away from said network, broadcasting a notification packet to all other nodes connected to said network.

2. The network monitoring device according to claim 1, further comprising a management table for storing logical addresses identifying the neighboring nodes upstream and downstream, respectively, and updating means for updating the management table when said determination means has determined that the neighboring node upstream has broken away from said network or upon receipt of the notification packet indicating that another node has broken away from said network.

3. The network monitoring device according to claim 2, wherein, when said node to which said network monitoring device belongs newly participates in said network, said updating means broadcasts a monitoring packet to all other nodes connected to said network and generates the management table based on response packets responsive to the monitoring packet, which can be sent by all of the other nodes.

4. The network monitoring device according to claim 3, wherein, in response to a monitoring packet from another node that has newly participated in said network, said response means sends a response packet responsive to the monitoring packet to the other node and said updating means updates the management table.

5. The network monitoring device according to claim 1, wherein said determination means sends a monitoring packet to at least one other node disposed between said node to which said network monitoring device belongs and the neighboring node upstream which has not yet participated in said network.

6. The network monitoring device according to claim 5, wherein, when the number of other nodes that lie between said node to which said network monitoring device belongs and the neighboring node upstream exceeds a threshold number, and those nodes have not yet participated in said network, said determination means broadcasts a monitoring packet to the other nodes that have not yet participated in said network.

7. The network monitoring device according to claim 1, further comprising searching means for, when said determination means has determined that the neighboring node upstream has broken away from said network, sending a monitoring packet to at least one other node that belongs to a search area upstream, and for searching for a new neighboring node upstream based on at least one packet response to the monitoring packet.

8. The network monitoring device according to claim 7, wherein, unless said searching means is able to find the new neighboring node upstream through the search area, said searching means changes and shifts the search area including at least one other node in an upstream direction, and then sends a monitoring packet to said the search area again.

9. The network monitoring device according to claim 2, further comprising numbering means for adding a time-sequence number to any packet to be sent to another node.

10. The network monitoring device according to claim 9, wherein, when said updating means needs to update the management table using a packet applied from another node, said updating means refers to a time-sequence number added to the packet, and then updates the management table only if the received packet is associated with latest event of events that have occurred in the other node.

11. A network monitoring device disposed at a node connected to a network, comprising:
    response means, responsive to a monitoring packet from a neighboring node upstream, for sending a response packet to the neighboring node upstream;
    determination means for sending the monitoring packet to a neighboring node downstream, and for determining that the neighboring node downstream has broken away from said network if said determination means does not receive the response packet responsive to the monitoring packet from the neighboring node downstream; and notification means for, when said determination means has determined that the neighboring node downstream has broken away from said network, broadcasting a notification packet to all other nodes connected to said network.

12. The network monitoring device according to claim 11, further comprising a management table for storing logical addresses identifying the neighboring nodes upstream and downstream, respectively, and updating means for updating the management table when said determination means has determined that the neighboring node downstream has broken away from said network or upon receipt of the notification packet indicating that another node has broken away from said network.

13. The network monitoring device according to claim 12, wherein, when said node to which said network monitoring device belongs newly participates in said network, said up-dating means broadcasts a monitoring packet to all other nodes connected to said network and generates the management table based on response packets responsive to the monitoring packet, which can be sent by all of the other nodes.

14. The network monitoring device according to claim 13, wherein, in response to a monitoring packet from another node that has newly participated in said network, said response means sends a response packet responsive to the monitoring packet to the other node and the updating means updates said management table.

15. The network monitoring device according to claim 11, wherein said determination means sends a monitoring packet to at least one other node disposed between said node to which said network monitoring device belongs and the neighboring node downstream which has not yet participated in said network.

16. The network monitoring device according to claim 15, wherein, when the number of other nodes that lie between said node to which said network monitoring device belongs and the neighboring node downstream exceeds a threshold number, and those nodes have not yet participated in said network, said determination means broadcasts a monitoring packet to the other nodes that have not yet participated in said network.

17. The network monitoring device according to claim 11, further comprising searching means for, when said determination means has determined that the neighboring node downstream has broken away from said network, sending a monitoring packet to at least one other node that belongs to a search area downstream, and for searching for a new neighboring node downstream based on at least one packet response to the monitoring packet.

18. The network monitoring device according to claim 17, wherein, unless said searching means is able to find the new neighboring node downstream through the search area, said searching means changes and shifts the search area including at least one other node in an downstream direction, and then sends a monitoring packet to the search area again.

19. The network monitoring device according to claim 12, further comprising numbering means for adding a time-sequence number to any packet to be sent to another node.

20. The network monitoring device according to claim 19, wherein, when said updating means needs to update management table using a packet applied from another node, said updating means refers to a time-sequence number added to the packet, and then updates the management table only if the received packet is associated with the latest event of events that have occurred in the other node.

* * * * *